(12) United States Patent
Yi et al.

(10) Patent No.: US 8,498,040 B2
(45) Date of Patent: Jul. 30, 2013

(54) COLOR ELECTRONIC PAPER DISPLAY DEVICE AND METHOD FOR MANUFACTURING THE SAME

(75) Inventors: Jong Su Yi, Yongin-si (KR); Young Woo Lee, Suwon-si (KR); Hwan Soo Lee, Suwon-si (KR); Sang Moon Lee, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 343 days.

(21) Appl. No.: 12/662,257

(22) Filed: Apr. 7, 2010

(65) Prior Publication Data

US 2011/0133627 A1    Jun. 9, 2011

(30) Foreign Application Priority Data

Dec. 9, 2009    (KR) ........................ 10-2009-0121857

(51) Int. Cl.
*G02B 26/00*    (2006.01)
(52) U.S. Cl.
USPC ........................................................ 359/296
(58) Field of Classification Search
USPC ........................................................ 359/296
See application file for complete search history.

(56) References Cited

U.S. PATENT DOCUMENTS

| | | | |
|---|---|---|---|
| 6,221,267 B1 | 4/2001 | Ikeda et al. | |
| 2004/0012849 A1* | 1/2004 | Cruz-Uribe et al. | .......... 359/449 |

FOREIGN PATENT DOCUMENTS

| | | |
|---|---|---|
| JP | 10-214049 | 8/1998 |
| JP | 2006-3924 | 1/2006 |
| JP | 2008-276153 | 11/2008 |
| WO | 2004/038498 | 5/2004 |

OTHER PUBLICATIONS

Japanese Office Action issued Aug. 21, 2012 in corresponding Japanese Patent Application No. 2010-109838.
Korean Office Action dated Mar. 9, 2011 issued in corresponding Korean Patent Application No. 10-2009-0121857.
Korean Notice of Allowance dated Nov. 30, 2011 issued in corresponding Korean Patent Application No. 10-2009-0121857.

* cited by examiner

*Primary Examiner* — James Jones

(57) ABSTRACT

A color electronic paper display device, which includes: a base; a first colorant disposed on the base; a second colorant disposed on the base, the second colorant having higher reflectance and smaller size than those of the first colorant; and an electrode part for applying voltages to the first and second colorants.

49 Claims, 22 Drawing Sheets

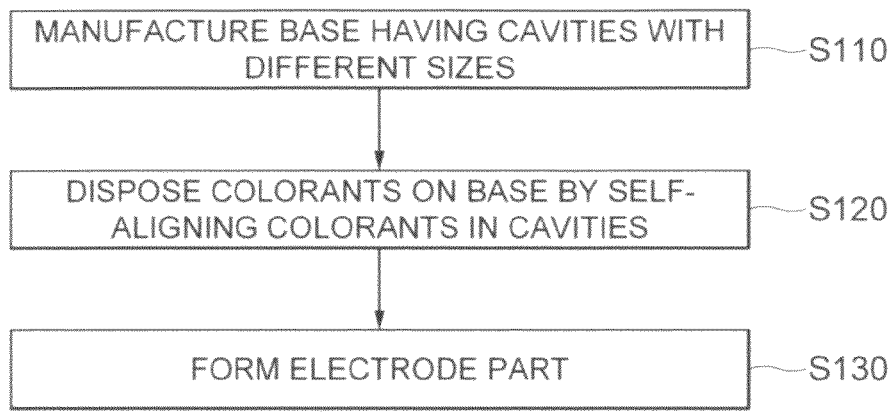
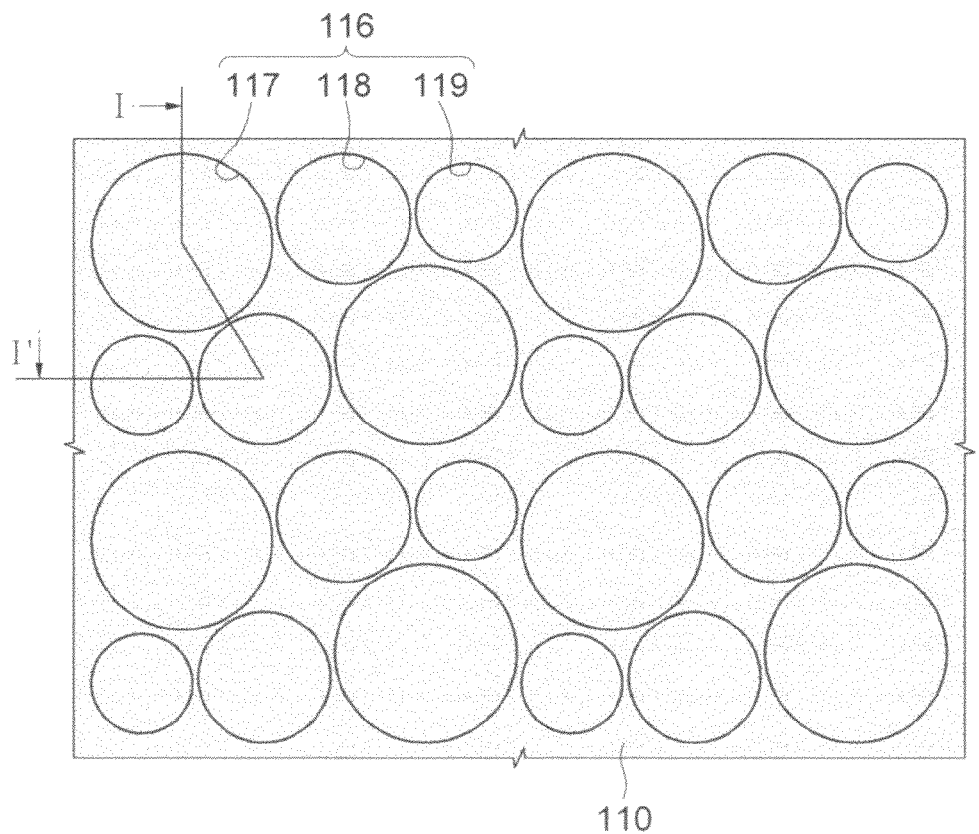

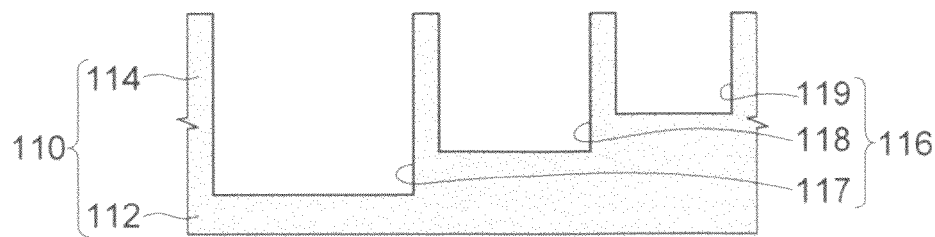
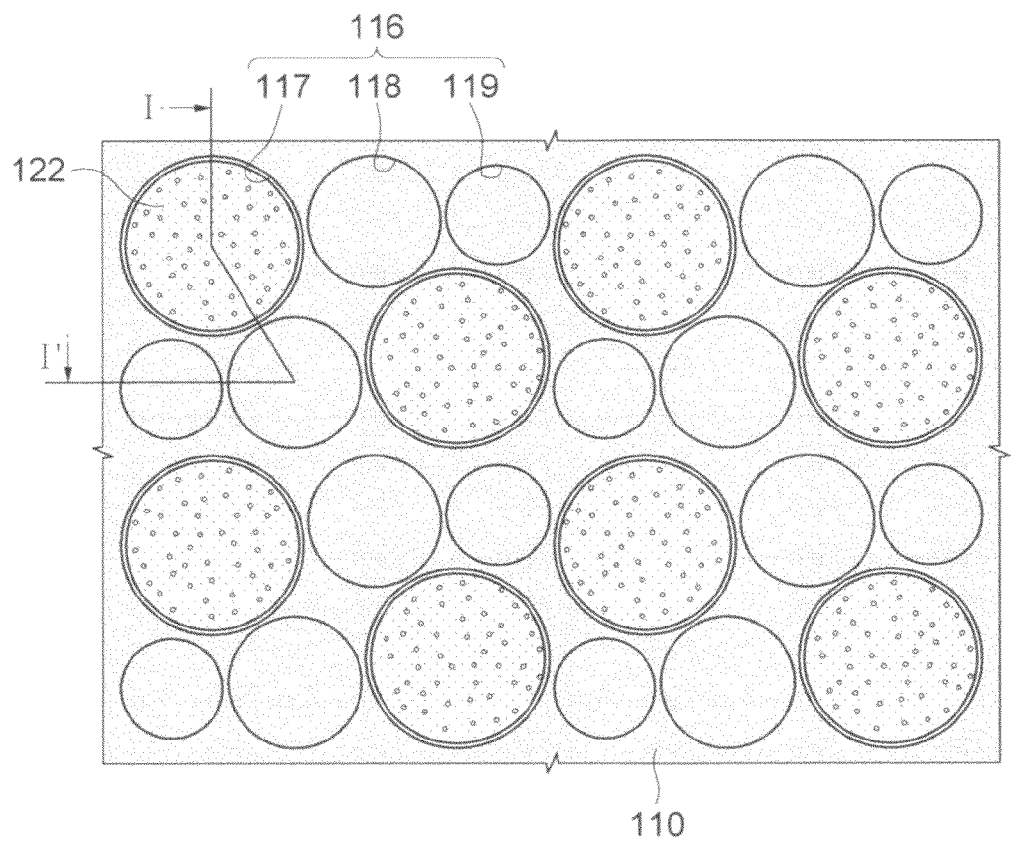

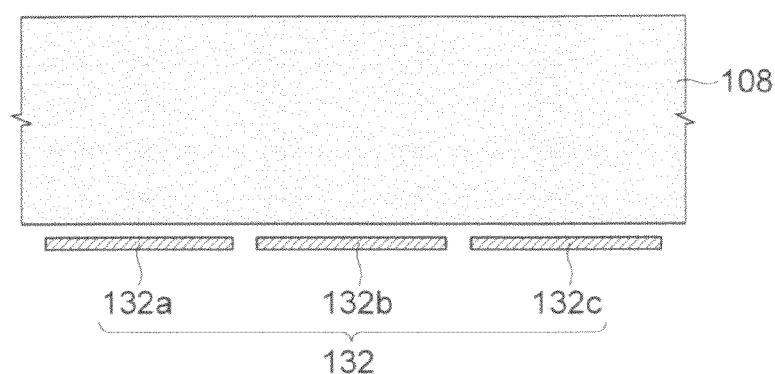
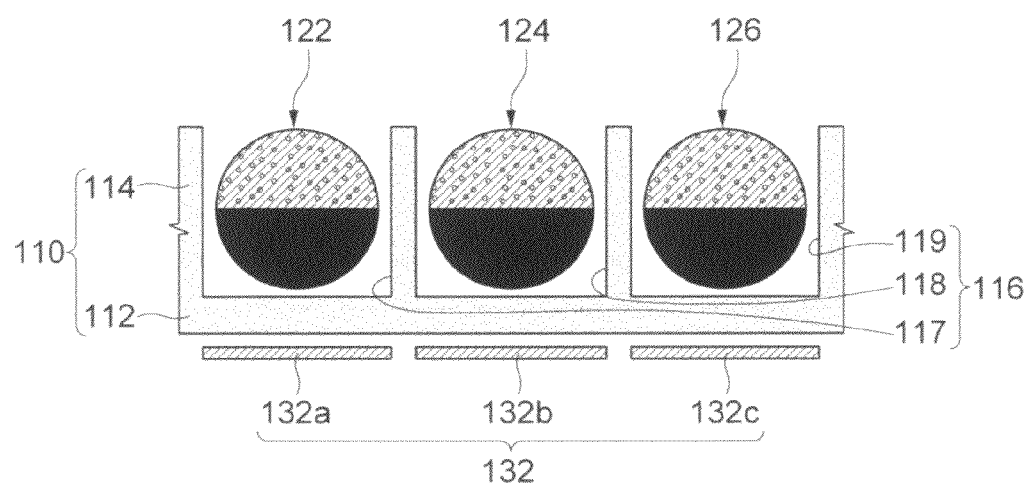

COLOR ELECTRONIC PAPER DISPLAY DEVICE AND METHOD FOR MANUFACTURING THE SAME

CROSS-REFERENCE TO RELATED APPLICATIONS

This application claims the benefit of Korean Patent Application No. 10-2009-0121857 filed with the Korea Intellectual Property Office on Dec. 9, 2009, the disclosure of which is incorporated herein by reference.

BACKGROUND OF THE INVENTION

1. Field of the Invention

The present invention relates to a color electronic paper display device and a method for manufacturing the same; and, more particularly, to a color electronic paper display device and a method for manufacturing the color electronic paper display device which can improve color expressiveness, and brightness.

2. Description of the Related Art

In next-generation display devices, an electronic paper display device is characterized by high flexibility and low-power driving force in comparison with other display devices. Thus, the electronic paper display has advantages in that it can be used as substitutions of paper printing medium such as a book and be applied to various fields (e.g., screen and electronic wall-paper). An electronic paper display device may be divided into a white/black electronic paper display device and a color electronic paper display device. The color electronic paper display device should be provided with colorants with at least three colors in order to express various colors. For example, electronic balls, electrophoretic fluid, and so on with a specific color corresponding to pigments are used as colorants of a color electronic paper display device.

However, different kinds of pigments have reflectance different from one another, and thus each of colorants with different colors has different reflection amounts. In this case, the color electronic paper display device has a non-uniform reflectance for each of colorants constituting one cell, and thus has reduced characteristics of clarity, color expressiveness, and brightness. Also, the color electronic paper display device has a reflectance for each unit-area reduced by 30% or more with respect to contrast ratio in comparison with a black/white electronic paper display device. Therefore, the color electronic paper display device has brightness and contrast ratio lower than those of the black/white electronic paper display device.

SUMMARY OF THE INVENTION

The present invention has been proposed in order to overcome the above-described problems and it is, therefore, an object of the present invention to provide a color electronic paper display device which has improved color expressiveness and clarity.

Further, another object of the present invention is to provide a color electronic paper display device which has improved brightness and contrast ratio.

Further, another object of the present invention is to provide a method for manufacturing a color electronic paper display device with improved color expressiveness and clarity.

Further, another object of the present invention is to provide a method for manufacturing a color electronic paper display device with improved brightness and contrast ratio.

In accordance with one aspect of the present invention to achieve the object, there is provided a color electronic paper display device including: a base; a first colorant disposed on the base; a second colorant disposed on the base, the second colorant having higher reflectance and smaller size than those of the first colorant; and an electrode part for applying voltages to the first and second colorants.

The first colorant and the second colorant include electronic balls each of which is constituted by hemispheres into which mutually different pigments are provided, and the second colorant has a diameter lower than that of the first colorant.

The first colorant and the second colorant have light-transmissive fluid containing pigment particles electrified into different charges, and the second colorant has a volume less than that of the first colorant.

The base includes: a plate for supporting the first colorant and the second colorant; and a partition wall extending from the plate, the partition wall partitioning the first colorant and the second colorant on the plate.

The base has cavities provided as spaces where the first and second colorants are disposed, and the partition wall helps the guiding of the first and second colorants so that the first and second colorants are entered into the cavities in a self-alignment manner.

The base has one side where a lower electrode is disposed and the other side where an upper electrode is disposed, wherein the lower electrode comprises: a first electrode opposite to the first colorant; and a second electrode opposite to the second colorant, and wherein the upper electrode comprises an electrode plate corresponding to the first colorant and the second colorant.

The base is provided with cavities provided as spaces where the first colorant and the second colorant are disposed, and each of the cavities is formed with an upper portion opened toward the upper electrode, a side surface surrounding the first and second colorants, and a lower surface for supporting the first and second colorants.

The first and second colorants are disposed to be spaced apart from the upper electrode at a predetermined interval within the cavities.

The color electronic paper display device further includes a third colorant which is disposed on the base and has higher reflectance and smaller size than those of the second colorant, wherein one cell is constituted by the first to third colorants whose centers are inter-connected to be in a triangle shape.

The cell includes first cells and second cells disposed to be rotated by 180° with respect to the first cells, wherein the first and second cells are alternatively disposed along a first direction, and are repeatedly disposed along a second direction perpendicular to the first direction.

The cell includes first cells and second cells disposed to be rotated by 180° with respect to the first cells, wherein the first and second cells are alternatively disposed along a first direction and a second direction perpendicular to the first direction, the first and second cells being disposed in an interdigited configuration.

The color electronic paper display device further includes a third colorant which is disposed on the base and has higher reflectance and smaller size than those of the second colorant, wherein one cell is constituted by the first to third colorants whose centers are disposed on the same line.

The color electronic paper display device further includes: a third colorant which is disposed on the base and has higher reflectance and smaller size than those of the second colorant; and a fourth colorant which is disposed on the base and has higher reflectance and smaller size than those of the third colorant, wherein one cell is constituted by the first to fourth colorants whose centers are inter-connected to be in a quadrangle shape.

The color electronic paper display device further includes: a third colorant which is disposed on the base and has higher reflectance and smaller size than those of the second colorant; and a fourth colorant which is disposed on the base and has higher reflectance and smaller size than those of the third colorant, wherein one cell is constituted by the first to fourth colorants whose centers are disposed on one line.

The cell includes first cells and second cells disposed to be rotated by 180° with respect to the first cells, wherein the first and second cells are alternatively disposed along a first direction in an iterative manner.

The first colorant and second colorant further comprise fluorescence pigment.

Each of the first and second colorants contains electronic balls formed by hemisphere electrified into different charges, and the fluorescence pigment is contained in any one of the hemisphere.

The fluorescence pigment is provided to a hemisphere in the hemisphere which has a relatively high reflectance.

Each of the first colorant and second colorant includes: light-transmissive fluid; pigment particles disposed on the light-transmissive fluid, wherein the fluorescence pigment is electrified into the same charges as particles which have high reflectance in the pigment particles.

The fluorescence pigment includes at least one of C.I.Acid yellow, C.I.Basic orange, C.I.acid red, eosin, cu-added zns, mn-added zns, ag-added zns, bi-added zns, fluorescein, tungsten acid calcium:cawo4, tungsten acid magnesium:mgwo4, znsio3-mn, cdsio2-mn, cdb2o5, and cdb2o5.

The C.I.Basic orange corresponds to C.I.Basic orange 14.

The C.I.acid red corresponds to C.I.acid red 87.

In accordance with other aspect of the present invention to achieve the object, there is provided a color electronic paper display device including: a base provided with cavities; colorants which are disposed in the cavities and constitute a cell; and an electrode part for applying voltages to the colorants, wherein the colorants constituting the cell have the same reflection amount as one other and have pigments and sizes different from one another.

Each of the colorants has electronic balls constituted by hemisphere electrified into different charges, any one of the hemisphere having the higher reflectance.

The cell has the electronic balls in plural disposed thereon, the electronic balls having centers positioned on one line.

The color electronic paper display device further includes fluorescence pigment provided to a hemisphere having the higher reflectance of the hemisphere.

The colorant includes: a light-transmissive fluid; and pigment particles electrified into different charges, the pigment particles being disposed within the light-transmissive fluid.

The color electronic paper display device further includes fluorescence pigment which is disposed within the light-transmissive fluid and is electrified into charges as many as those of pigments particles that have the higher reflectance of the pigment particles.

In accordance with other aspect of the present invention to achieve the object, there is provided a method for manufacturing a color electronic paper display device including the steps of: preparing a base; disposing a first colorant on the base; disposing a second colorant with higher reflectance and smaller size than those of the first colorant; and forming an electrode part, which applies voltages the first colorant and the second colorant, on the base.

The first colorant and the second colorant are controlled to have the same reflection amount as each other.

The step of preparing the base includes the steps of: preparing a pre-base; and forming cavities which are provided as spaces where the first colorant and second colorant are disposed on the pre-base and have mutually different sizes.

The step of disposing the first colorant includes the steps of: preparing a first electronic ball constituted by hemisphere electrified into different charges; and providing the first electronic ball on the base to thereby be entered into a cavity with the largest size in the cavities by a self-alignment manner.

The step of disposing the second colorant includes the steps of: preparing a second electronic ball with a lower size than that of the first electronic ball; and after supplying the first electronic ball on the base, supplying the second electronic ball on the base to thereby be entered into a second-largest cavity in the cavities by a self-alignment manner.

The step of forming the cavities includes a step of performing at least one of a photoresist etching process, a laser drill manufacturing process, and a mechanical drill manufacturing process for the pre-base.

The step of disposing the first colorant includes the steps of: infusing light-transmissive fluid into the cavity; and infusing pigment particles electrified into different charges into the light-transmissive fluid.

The step of forming the electrode part includes the steps of: forming a lower electrode on one side of the base; forming an upper electrode on the other side of the base, wherein the step of forming the lower electrode comprises the steps of: forming a first electrode disposed to correspond to the first colorant; and forming a second electrode disposed to correspond to the second colorant, and wherein the step of forming the upper electrode comprises a step of forming an electrode plate corresponding to the first and second colorants.

The step of preparing the base includes a step of preparing a pre-base shaped like a plate, and wherein the step of forming the electrode part comprises the steps of: before the first and second colorants are disposed on the base, forming the lower electrode on a lower portion of the pre-base; and after the first and second colorants are disposed on the base, forming the upper electrode on an upper portion of the pre-base.

The step of forming the upper electrode is performed after cavities are formed as spaces where the first and second colorants are disposed on the pre-base.

The method further includes a step of disposing a third colorant with which the first and second colorants constitute one cell, on the base, wherein, in the step of disposing the first to third colorants, when centers of first to third colorants are inter-connected, the centers are formed in a triangle shape.

The method further includes a step of disposing a third colorant with which the first and second colorants constitute one cell, on the base, wherein, in the step of disposing the first to third colorants, centers of the first to third colorants are positioned on one line.

The method further includes a step of disposing third and fourth colorant with which the first and second colorants constitute one cell, on the base, wherein, in the step of disposing the first to fourth colorants, when centers of first to fourth colorants are inter-connected, the centers are formed in a quadrangle shape.

The method further includes a step of disposing third and fourth colorant with which the first and second colorants constitute one cell, on the base, wherein, in the step of disposing the first to fourth colorants, centers of first to fourth colorants are disposed to be positioned on one line.

The method further includes a step of providing fluorescence pigments to the first and second colorants.

In accordance with other aspect of the present invention to achieve the object, there is provided a method for manufacturing a color electronic paper display device, the method including the steps of: preparing a base formed with cavities with different sizes; forming colorants on the cavities; and forming an electrode part, which applies voltages the colorants, on the base.

The step of forming the colorants includes a step of disposing electronic balls on the cavities, each electronic ball being constituted by hemisphere electrified into different charges on the base.

The step of forming the colorants includes a step of providing the fluorescence pigment to a hemisphere having the higher reflectance in the hemisphere, the hemisphere being electrified into different charges on the base.

The step of forming the colorants comprises a step of providing a black pigment to a hemisphere with relatively lower reflectance in the hemisphere.

In the step of forming the colorants, electrophoretic fluid having pigment particles electrified into different charges is formed on the cavities.

The step of forming the electrophoretic fluid includes the steps of: infusing light-transmissive fluid in the cavities; and electrifying the fluorescence pigments into charges as many as those of pigment particles having a high reflectance in the pigment particles, thereby infusing the charges into the light-transmissive fluid.

In accordance with other aspect of the present invention to achieve the object, there is provided a method for manufacturing a color electronic paper display device including: a plurality of electronic balls constituted by hemisphere electrified into different charges, a base formed with cavities on which the electronic balls are disposed, and an electrode part for switching the electronic balls, wherein the cavities and electronic balls are formed to have sizes different from one another, so that the electronic balls are disposed in a self-alignment manner in the cavities according to their sizes.

In the step of forming the electronic balls with different sizes, an electronic ball with pigment having high reflectance in the electronic balls is larger than an electronic ball with pigment having low reflectance with respect to the electronic ball with the high reflectance.

In the step of forming the electronic balls with different sizes, each of the electronic balls with different sizes has the same reflection amount as one other.

In the step of self-aligning the electronic balls into the cavities, the electronic balls are disposed in the cavities in order from an electronic ball with the largest size to an electronic ball with the smallest size.

The electrode part includes an upper electrode shaped like an electrode plate which is disposed to face a portion where the cavities are opened, each of the cavities being adjusted to have depths enough to be spaced part from the electrode plate at a predetermined interval.

In the step of disposing the electronic balls in the cavities, when centers of three electronic balls constituting one cell in the electronic balls are interconnected, the electronic balls are disposed on the base to be in a triangle shape.

In the step of disposing the electronic balls in the cavities, when centers of four electronic balls constituting one cell in the electronic balls are interconnected, the electronic balls are disposed on the base to be a quadrangle shape.

In the step of disposing the electronic balls in the cavities, when centers of four electronic balls constituting one cell in the electronic balls are interconnected, the electronic balls are disposed on the base on one line.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 4 is a flowchart showing a method for manufacturing the color electronic paper display device in accordance with one embodiment of the present invention;

FIGS. 5A, 6A, 7A, 8A, and 9A are views showing processes for manufacturing the color electronic paper display device in accordance with one embodiment of the present invention, respectively;

FIGS. 5B, 6B, 7B, 8B, and 9B are cross-sectional view the devices taken along the line I-I' of FIGS. 5A, 6A, 7A, 8A, and 9A;

FIGS. 11A to 11C are views showing processes for manufacturing the color electronic paper display device in accordance with modified embodiment of the present invention, respectively;

DETAILED DESCRIPTION OF THE PREFERABLE EMBODIMENTS

Figure 1:
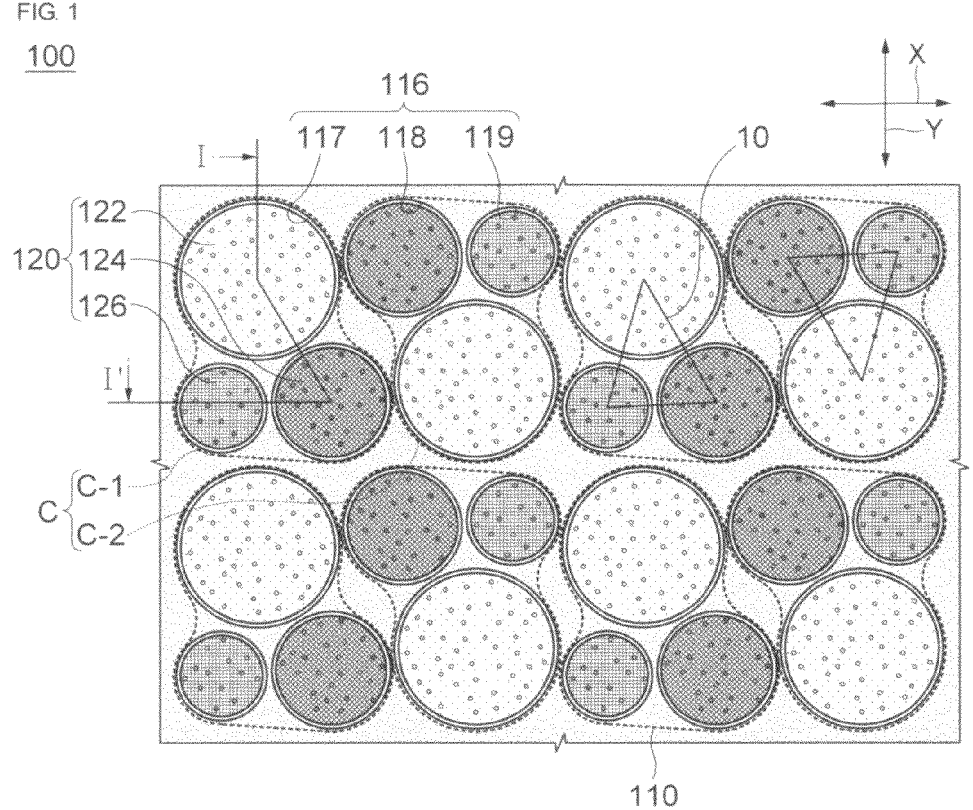
FIG. 1 is a top view showing a color electronic paper display device in accordance with one embodiment of the present invention.

Embodiments of a color electronic paper display device and a method for manufacturing the same in accordance with the present invention will be described in detail with reference to the accompanying drawings. When describing them with reference to the drawings, the same or corresponding component is represented by the same reference numeral and repeated description thereof will be omitted.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, a detailed description will be given of a color electronic paper display device and a method for manufacturing thereof in accordance with embodiments of the present invention.

Figure 2:
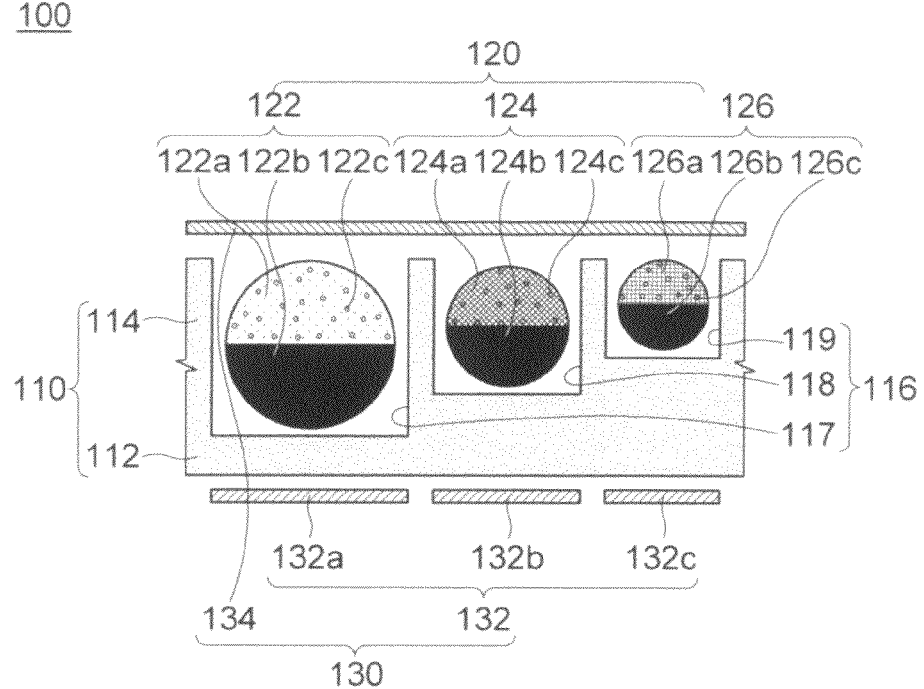
FIG. 2 is a cross-sectional view showing the device taken along the line I-I' of FIG. 1.
Figure 3:
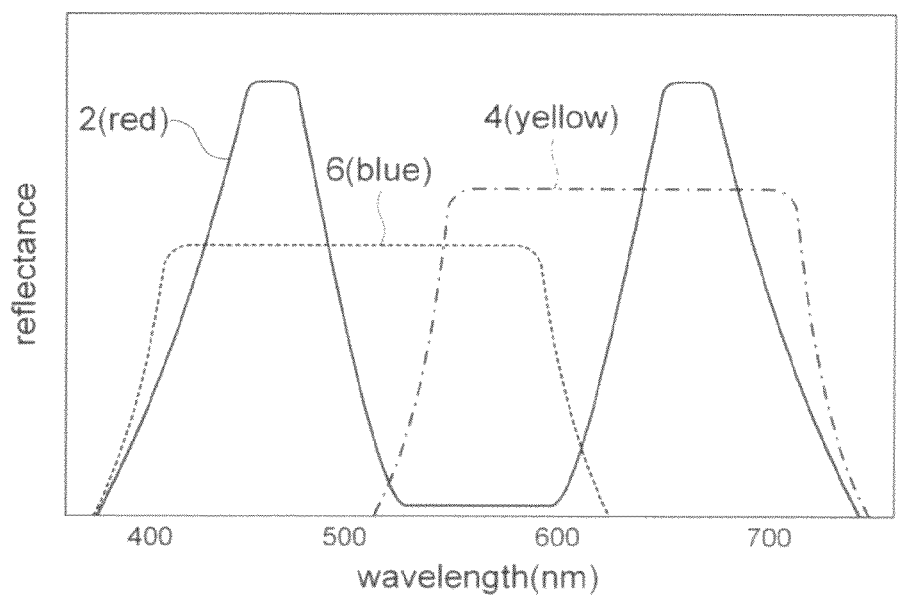
FIG. 3 is a graph showing reflectance of pigments.
Figure 6B:
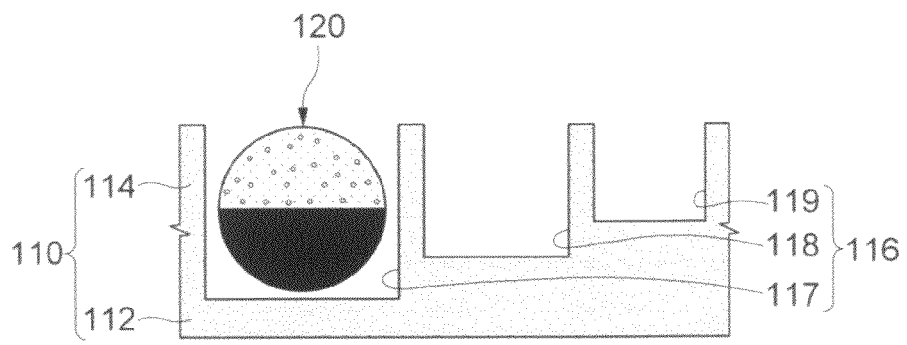

FIG. 1 is a top view showing a color electronic paper display device in accordance with one embodiment of the present invention. FIG. 2 is a cross-sectional view showing the device taken along the line I-I' of FIG. 1. FIG. 3 is a graph showing reflectance of pigments.

Referring to FIGS. 1 and 2, the color electronic paper display device 100 in accordance with one embodiment of the present invention may include a base 110, colorant 120, and an electrode part 130. Herein, the electrode part 130 will not shown in FIG. 1, for convenience of description.

The base 110 can support constructions of the color electronic paper display device 100. For example, the base 110 may have a plate 112 and a partition wall 114. The plate 112 may be a substrate that supports the colorant 120. As for the plate 112, a metal plate made of metallic material like Cu and Ag may be exemplified. As for another one, an insulating plate made of one of plastic and glass materials may be exemplified.

The partition wall 114 can partition the colorant 120 on the plate 112. For example, the partition wall 114 extends upward from the plate 112 so that it can surround the colorant 120. In addition, the partition wall 114 may be structured to upwardly expose the colorant 120. As the partition wall 114 is structured as described above, the base 110 may have a plurality of cavities each of which is defined into an opened upper portion, a side surface, and a lower surface. For example, the cavities 116 may include a first cavity 117, a second cavity 118, and a third cavity 119 each of which has a size different from one another. The first cavity 117 may have a diameter larger than that of the second cavity 118, and the second cavity 118 may have a diameter larger than that of the third cavity 119. Each of the first to third cavities 117 to 119 may have a cross section corresponding to the colorant 120. Thus, the first cavity 117 may have a volume larger than that of the second cavity 118, and the second cavity 118 may have a volume larger than that of the third cavity 119.

The colorant 120 may be disposed to be partitioned on the plate 112 by the partition wall 114. For example, the colorant 120 may include a first electronic ball 122, a second electronic ball 124, and a third electronic ball 126 all of which are partitioned by the partition wall 114. Each of the first to third electronic balls 122 to 126 may have almost a hemisphere shape. The first electronic ball 122 may have a diameter larger than that of the second electronic ball 124, and the second electronic ball 124 may have a diameter larger than that of the third electronic ball 126. The first to third electronic balls 122 to 126 may be disposed sequentially in the first to third cavities 117 to 119. As shown in FIG. 1, the first to third electronic balls 122 to 126 may be disposed on the plate 112 to occupy an area with a different size for each of them.

Each of the first to third electronic balls 122 to 126 is constituted by hemispheres containing pigments different from each other. Also, each of the first to third electronic balls 122 to 126 may be constituted by hemispheres electrified into different charges from each other. For example, the first electronic ball 122 may be constituted by a blue hemisphere 122a and a black hemisphere 122b that is electrified into charges different from those of the blue hemisphere 122a. The second electronic ball 124 may be constituted by a yellow hemisphere 124a and a black hemisphere 124b that is electrified into charges different from those of the yellow hemisphere 124a. The third electronic ball 126 may be constituted by a red hemisphere 126a and a black hemisphere 126b that is electrified into charges different from those of the red hemisphere 126a. The blue hemisphere 122a may contain blue-based (or sky blue color) pigment, the yellow hemisphere 124a contain yellow-based pigment, and the red hemisphere 126a contain red-based pigment. The black hemispheres 122b to 126b may contain black-based pigments. Also, the blue, yellow, and red hemispheres 122a to 126a may be electrified to have negative charges and the black hemispheres 122b to 126b may be electrified to have positive charges. In this case, the black hemispheres 122b to 126b may have light absorption relatively higher than those of the blue, yellow, and red hemispheres 122a to 126a. On the contrary, the blue, yellow, and red hemispheres 122a to 126a may have light reflectance higher than those of the black hemispheres 122b to 126b.

Meanwhile, the first to third electronic balls 122 to 126 may be adjusted to have the same reflection amount as one another. In particular, as shown in FIG. 3, the pigments have reflectance depending on their types. That is, red-based pigment 2 has largely reflectance relatively higher than that of yellow-based pigment 4, and blue-based pigment 6 has largely reflectance relatively higher than that of the yellow-based pigment 4. Meanwhile, the size of the colorant 120 may be proportional to the reflectance of pigments. That is, the smaller the colorant 120, the less the reflection amounts of the colorant 120. Thus, an electronic ball containing pigment with relatively high reflectance is controlled to be relatively small, so that each of electronic balls with different pigments has the same reflection amounts as one another. Thus, the first electronic ball 122 with the blue hemisphere 122a is controlled to be bigger than the second electronic ball 124 with the yellow hemisphere 124a, and the second electronic ball 124 is controlled to be bigger than the third electronic ball 126 with the red hemisphere 126a.

Also, the colorant 120 may be provided to achieve a planar arrangement in which it is possible to minimize intervals between the first to third electronic balls 122 to 126. As described above, the first to third electronic balls 122 to 126 have diameters mutually different from one another, so that the first to third electronic balls 122 to 126 may occupy an area with different sizes from one another. Thus, there exist intervals between the first to third electronic balls 122 to 126. However, as these intervals become wider, sharpness, uniformity, and color expressiveness for the display device may be reduced. Therefore, the first to third electronic balls 122 to 126 should be disposed on plane to achieve minimum intervals therebetween. For example, as shown in FIG. 1, when centers of the first to third electronic balls 122 to 126 within one cell C are interconnected to one another, the first to third electronic balls 122 to 126 may be disposed on plane so that the connection lines are formed in one triangle shape. The triangle made by the lines 10 may include an equilateral triangle, and various shapes of a right triangle. Also, the cell C may be iteratively disposed on the base 110 in such a manner that the first to third electronic balls 122 to 126 have minimum intervals therebetween. That is, the cell C may be disposed to have a repeated pattern along a first direction X and a second direction Y almost perpendicular to the first direction X. In particular, the cell C may include first cells C-1 with a first pattern, and second cells C-2 structured to be rotated by 180° than the first cells C-1. The first and second cells C-1 and C-2 may be alternatively disposed along the first direction X in an iterative manner. In addition, the first and second cells C-1 and C-2 may be disposed along the second direction Y in an iterative manner.

Also, the colorant 120 may further contain fluorescence pigment. The fluorescence pigment may be material which absorbs UV rays to thereby represent a specific color. The fluorescence pigment may be provided to one hemisphere of hemispheres constituting one electronic ball. In particular, the fluorescence pigment may be provided to a hemisphere that has the higher reflectance from among the hemispheres of one electronic ball. For example, blue-based fluorescence pigment (hereinafter, referred to as 'blue fluorescence pigment 122c') may be provided to the blue hemisphere 122a of the first electronic ball 122. The blue fluorescence pigment 122c' may include at least one of tungsten acid calcium:CaWO4, and tungsten acid magnesium:MgWO4. Yellow-based fluorescence pigment (hereinafter, referred to as 'yellow fluorescence pigment 124c') may be provided to the yellow hemisphere 124a of the second electronic ball 124. The yellow fluorescence pigment 124c' may include at lest one of Mn-added ZnS, C.I.Acid yellow, C.I.Basic orange, and C.I.acid red. A red-based fluorescence pigment (hereinafter, referred to as 'red fluorescence pigment 126c') may be provided to the red hemisphere 126a of the third electronic ball 126. The fluorescence pigment 126c may include at least one of C.I.acid red, Bi-added ZnS, CdSiO2-Mn, and CdB2O5. When the colorant 120 includes an electronic ball constituted by green-based hemispheres, a green-based fluorescence pigment may be provided to the green hemisphere. The green-based fluorescence pigment may include at least one of Cu-added ZnS, ZnSiO3-Mn, eosin, fluorescein. Also, when the colorant 120 includes an electronic ball constituted by purple-based hemispheres, a purple-based fluorescence pigment may be provided to the purple hemisphere. As for the purple-based fluorescence pigment, Ag-added ZnS may be used. Meanwhile, hemispheres with relatively lower reflectance than those of hemispheres constituting the colorant 120 may have no fluorescence pigment added thereto. That is, the fluorescence pigment may fail to be added to each of the black hemispheres 122b to 126b within the first to third electronic balls 122 to 126. The first to third electronic balls 122 to 126 may have a structure where the blue, yellow and red hemispheres 122a to 126a have relatively increased reflectance than those of the black hemispheres 122b to 126b by the blue, yellow and red fluorescence pigments 122c to 126c.

The electrode part 130 may be a transparent electrode with light-transmissive. The electrode part 130 may have a lower electrode 132 which is disposed on one side of the base 110, and an upper electrode 134 which is disposed on the other side of the base 110. The lower electrode 132 may include a first electrode 132a, a second electrode 132b, and a third electrode 132c. The first electrode 132a may be disposed to correspond to the first electronic ball 122, the second electrode 132b may be disposed to correspond to the second electronic ball 124, and the third electrode 132c may be disposed to correspond to the third electronic ball 126. The upper electrode 134 may be disposed to correspond to all the first to third electronic balls 122 to 126. For example, the upper electrode 134 may be provided as an electrode plate which faces a front surface of the base 110.

The electrode part 130 allows the first to third electronic balls 122 to 126 to be rotated within the cavities 116. For example, when a negative voltage is applied to the lower electrode 132, and a positive voltage is applied to the upper electrode 134, the first to third electronic balls 122 to 126 are rotated in such a manner that the blue, yellow and red hemispheres 122a to 126a are allowed to face the first electrode 132a. Conversely, when a positive voltage is applied to the lower electrode 132 and a negative voltage is applied to the upper electrode 134, the first to third electronic balls 122 to 126 are rotated in such a manner that the yellow and red hemispheres 122a to 126a are allowed to face the lower electrode 132, and the black hemispheres 122b to 126b are allowed to face the upper electrode 134. In such a way, the electrode part 130 can selectively switch the first to third electronic balls 122 to 126. Moreover, by the switching operation of the first to third electronic balls 122 to 126, it is possible to display an image to an outside. Meanwhile, in order to effectively rotate the first to third electronic balls 122 to 126, a predetermined amount of dielectric fluid (not shown) may be filled in the cavities 116. The dielectric fluid may be a light-transmissive material. As for the dielectric fluid, at least one of polyacrylic-based resin, PUA-based resin, and PDMS-based resin may be exemplified. The colorant 120 may be disposed in a state where it floats within the cavities 116 by the dielectric fluid. Therefore, the dielectric fluid helps the easy operation of the first to third electronic balls 122 to 126.

The color electronic display device 100 with the above-described structure may be provided with the first to third electronic balls 122 to 126 each of which is controlled to be different in size in such a manner to have the same reflectance as one another. Thus, the color electronic paper display device 100 in accordance with an embodiment of the present invention can uniformize reflection amount of the colorant 120, thereby representing white color enough to be close to pure white color, and improving clarity, color expressiveness, and brightness.

The color electronic paper display device 100 in accordance with one embodiment of the present invention may be provided with the first to third electronic balls 122 to 126 with different sizes which are disposed in a planar structure to thereby minimize intervals therebetween. Thus, the color electronic paper display device 100 in accordance with an embodiment of the present invention can represent white color enough to be more close to pure white color, and improve clarity, color expressiveness, and brightness.

Also, when the color electronic paper display device 100 is provided with the first to third electronic balls 122 to 126 having fluorescence pigments added thereto which absorb UV rays to represent a certain color, so that it is possible to improve reflectance of the colorant 120. Thus, the color electronic paper display device 100 is provided with the first to third electronic balls 122 to 126 with increased reflectance, thereby improving contrast ratio of black and white, clarity, color expressiveness, and brightness.

Continuously, a detailed description will be given of processes of manufacturing the color electronic paper display device in accordance with one embodiment of the present invention with reference to FIGS. 4 to 9B. Herein, repeated description of the above-mentioned color electronic paper display device 100 will be omitted or simplified.

FIG. 4 is a flowchart showing a method for manufacturing the color electronic paper display device in accordance with one embodiment of the present invention. FIGS. 5A to 9A are views showing processes for manufacturing the color electronic paper display device in accordance with one embodiment of the present invention, respectively. FIGS. 5B to 9B are cross-sectional view the devices taken along the line I-I' of FIGS. 5A to 9A.

Referring to FIGS. 4, 5A, and 5B, the base 110 having the cavities 116 with different sizes may be manufactured (step S110). For example, a step of manufacturing the base 110 may include the steps of preparing a pre-base, and forming the first to third cavities 117 to 119. For example, the step of forming the cavities 116 may be made by photoresist-etching the pre-base. Alternatively, the step of forming the cavities 116 may be made by manufacturing the pre-base through a laser drill or a mechanical drill. Thus, the base 110 may be manufactured to include the plate 112 and the partition wall 114 which extends upwardly from the plate 112 and defines the cavities 116. Meanwhile, as shown in FIG. 2, the cavities 116 may include first to third cavities 117 to 119 with depths different from one another. Therefore, each of the first to third cavities 117 to 119 may be formed by sequentially performing mutually different photoresist etching processes. Alternatively, the first to third cavities 117 to 119 may be formed by sequentially performing mutually different manufacturing process employing a laser drill or a mechanical drill.

Figure 7A:
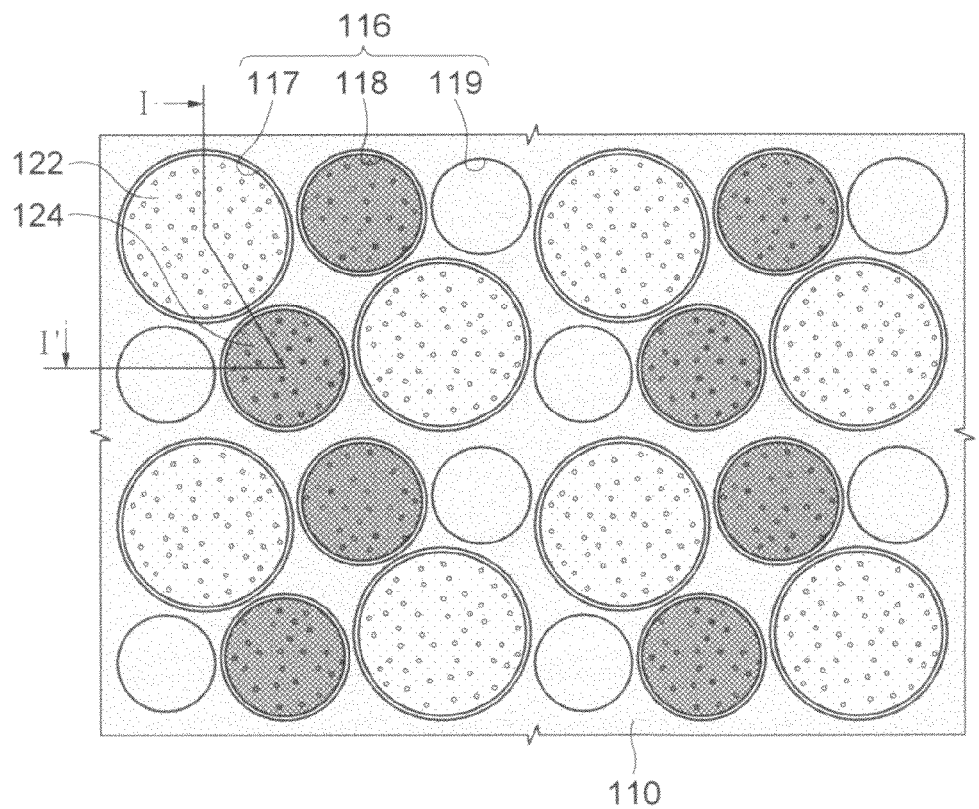
Figure 7B:
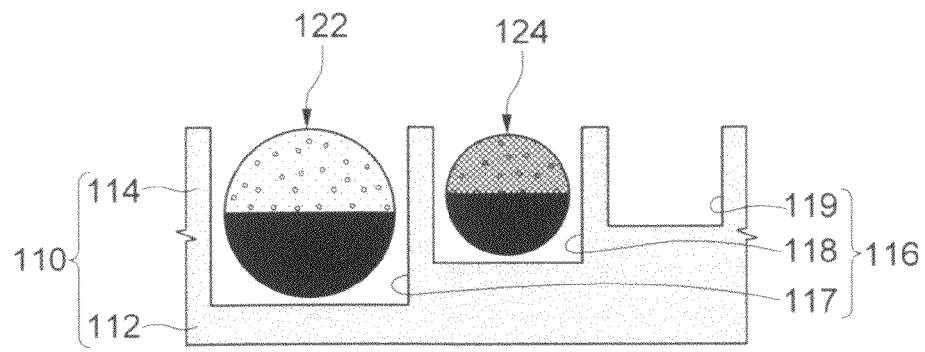
Figure 8A:
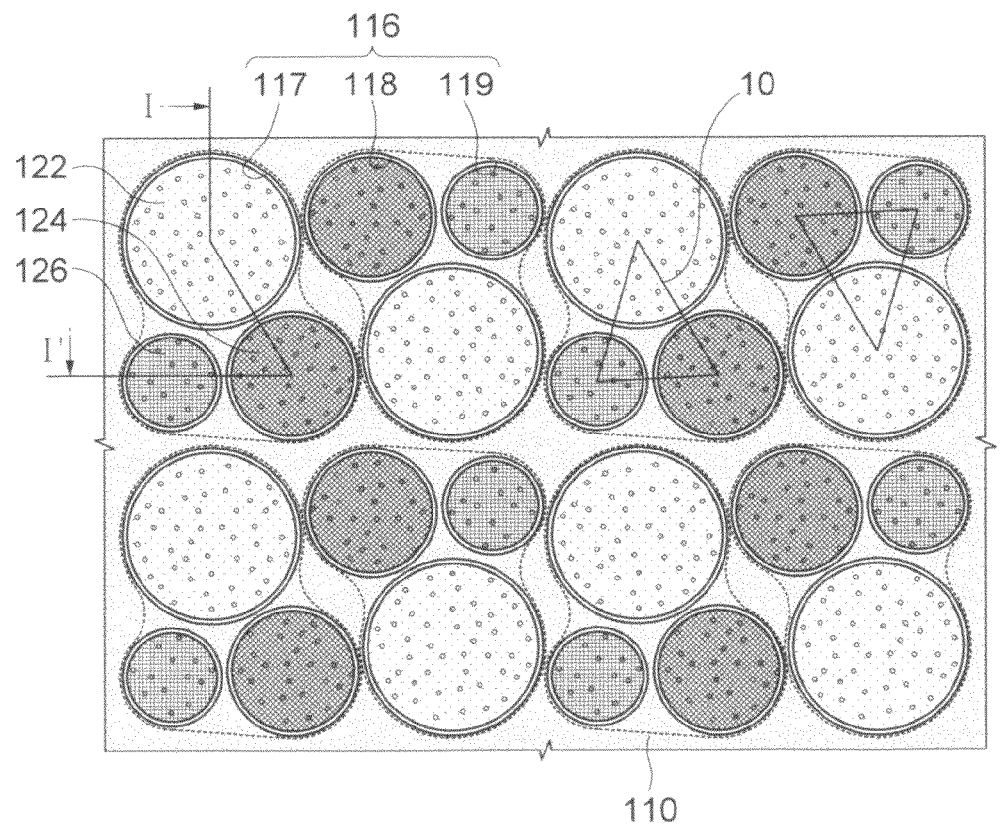
Figure 8B:
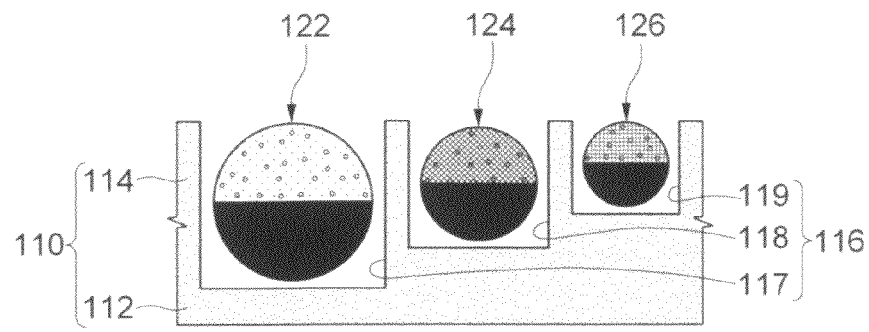

Referring to FIG. 4, the colorant 120 is entered into the cavities 116 in a self-alignment manner, so that the colorant 120 may be disposed on the base 110 (step S120). For example, referring to FIGS. 6A to 6B, the first electronic ball 122 with the biggest size may be provided on the base 110. The first electronic ball 122 may have lower diameter than that of the first cavity 117, whereas the first electronic ball 122 may have bigger diameters than those of the second and third cavities 118 and 119. Thus, the first electronic ball 122 is guided by the partition wall 114 and thus is selectively disposed only in the first cavity 117 in a self-alignment way, so that the first electronic ball 122 is entered into the first cavity 117. Referring to FIGS. 7A to 7B, the second electronic ball 124 may be provided on the base 110. The second electronic ball 124 may have lower diameters than those of the first and second cavities 117 and 118, whereas the second electronic ball 124 may have bigger diameter than that of the third cavity 119. At this time, since the first electronic ball 122 is disposed in the first cavity 117, the second electronic ball 124 is guided by the partition wall 114 and is selectively disposed only in the second cavity 118 in a self-alignment manner, so that the second electronic ball 124 is entered into the second cavity 118. Thereafter, referring to FIGS. 8A to 8B, the third electronic ball 126 may be provided on the base 110. The third electronic ball 126 may have lower diameters than those of the first to third cavities 117 and 119. At this time, since the first and second electronic balls 122 and 124 are disposed in the first and second cavities 117 and 118, the third electronic ball 126 is guided by the partition wall 114 and is selectively disposed only in the third cavity 119 in a self-alignment manner, so that the third electronic ball 126 is entered into the third cavity 119.

Figure 9A:
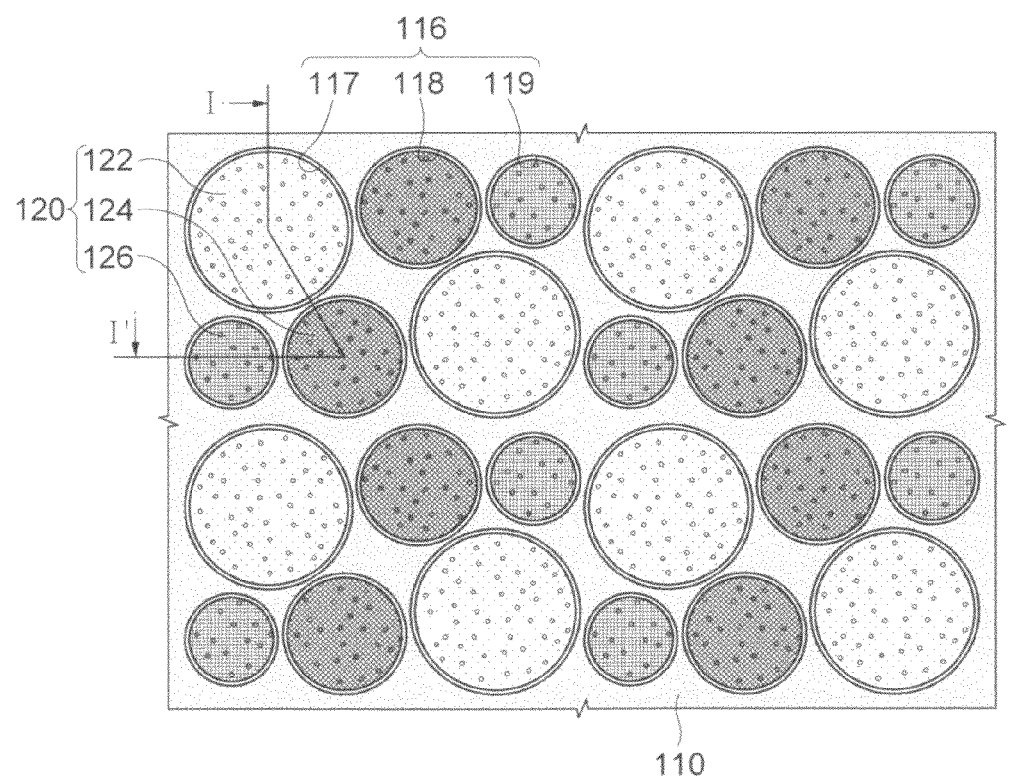
Figure 9B:
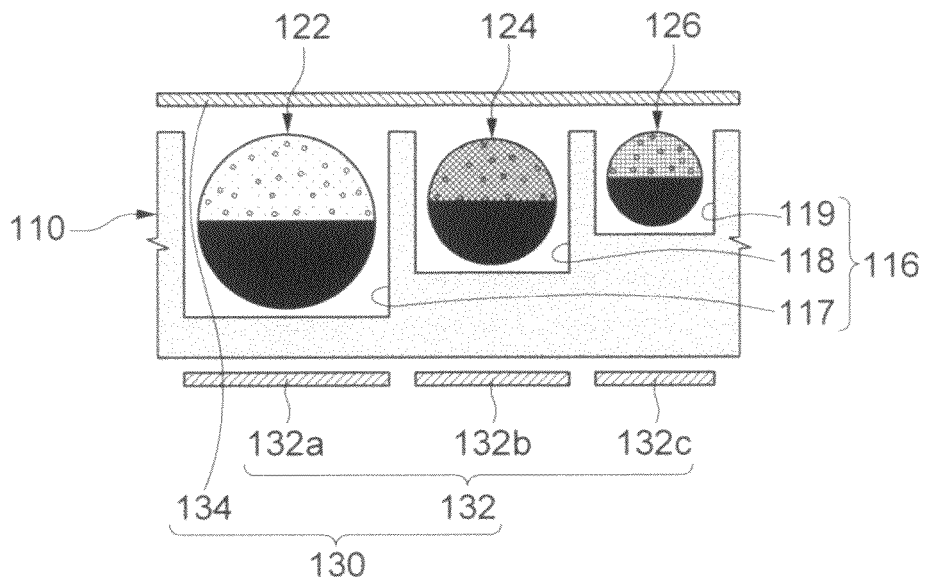

Referring to FIGS. 4, 9A, and 9B, the electrode part 130 may be formed on the base 110 (step S130). The step of forming the electrode part 130 may include the steps of: forming a lower electrode 132 on one side of the base 110, and forming an upper electrode 134 on the other side of the base 110. The step of forming the lower electrode 132 may include the steps of: forming the first electrode 132a corresponding to the first electronic ball 122, forming the second electrode 134a corresponding to the second electronic ball 124, and forming the third electrode 136a corresponding to the third electronic ball 126. And, the step of forming the upper electrode 134 may include a step of forming an electrode plate corresponding to the first to third electronic balls 122 to 126 at the other side of the base 110.

As described above, by the method for manufacturing the color electronic paper display device in accordance with one embodiment of the present invention, it is possible to manufacture the color electronic paper display device 100 which is provided with the first to third electronic balls 122 to 126 which have been controlled to have different sizes so that they has the same reflection amount as one another. Thus, by the method for manufacturing the color electronic paper display device in accordance with one embodiment of the present invention, it is possible to uniformize reflection amounts of colorant 120, thereby achieving color electronic paper display device 100 with improved color clarity, color expressiveness, and brightness characteristics.

Moreover, by the method for manufacturing the color electronic paper display device in accordance with one embodiment of the present invention, it is possible to sequentially dispose the first to third electronic balls 122 to 126 with different sizes into the first to third cavities 117 to 119 with different sizes in a self-alignment manner. Thus, by the method for manufacturing the color electronic paper display device in accordance with one embodiment of the present invention, it is possible to effectively dispose the electronic balls at a preset location, thereby improving efficiency and precision in manufacturing an electronic paper display device.

Furthermore, by the method for manufacturing the color electronic paper display device in accordance with one embodiment of the present invention, the colorant 120 may be disposed to minimize intervals between the first to third electronic balls 122 to 126. Therefore, it is possible to manufacture the color electronic paper display device 100 having improved color clarity, color expressiveness, and bright characteristics due to the uniform reflection amounts of the colorants.

Continuously, a detailed description will be given of a process of manufacturing a color electronic paper display device in accordance with a modified embodiment of the present invention. Herein, repeated description of the above-mentioned color electronic paper display device will be omitted or simplified.

Figure 10:
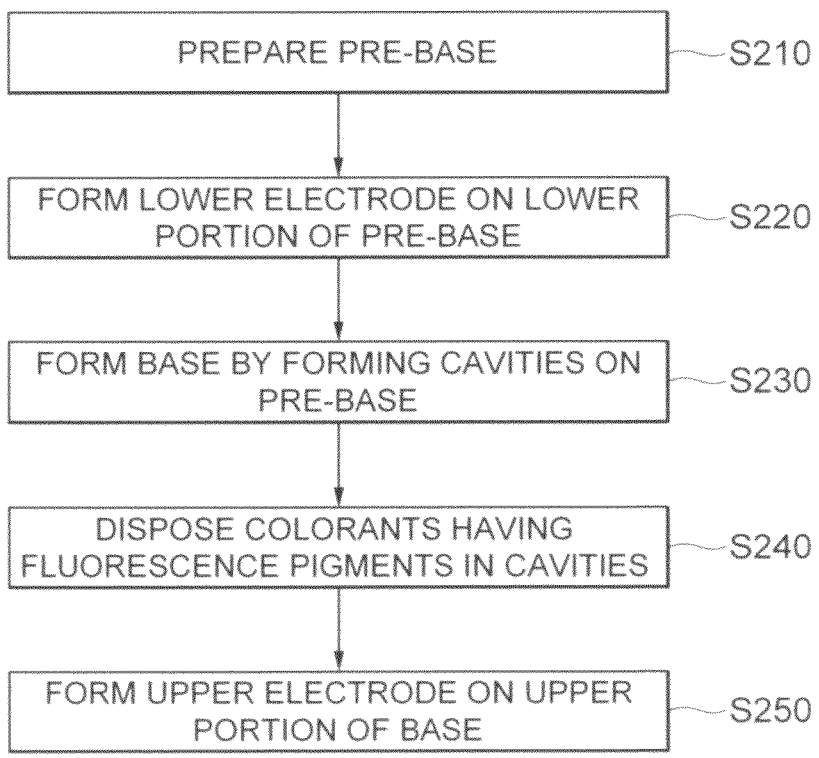
FIG. 10 is a flowchart showing a method for manufacturing the color electronic paper display device in accordance with a modified embodiment of the present invention.
Figure 11C:
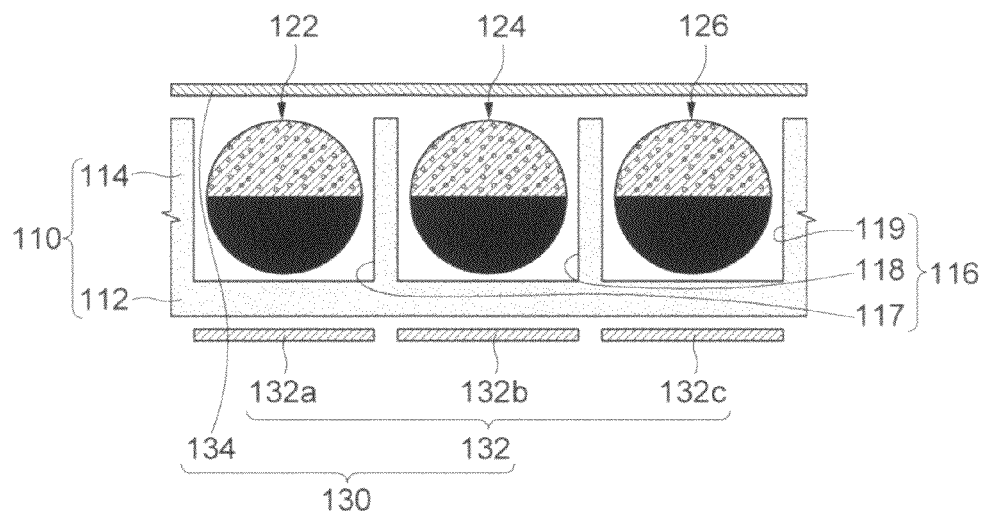

FIG. 10 is a flowchart showing a method for manufacturing the color electronic paper display device in accordance with a modified embodiment of the present invention. FIGS. 11A to 11C are views showing processes for manufacturing the color electronic paper display device in accordance with modified embodiment of the present invention, respectively.

Referring to FIGS. 10 to 11A, a pre-base 108 may be prepared (step S210). For example, the step of preparing the pre-base 108 may include a step of preparing a light-transmissive plate almost shaped like a plate.

The lower electrode 132 may be formed on the lower portion of the pre-base 108 (step S220). The step of forming the lower electrode 132 may include a step of forming the first to third electrodes 132a to 132c. The lower electrode 132 may be used as a supporting body for supporting the pre-base 108.

Referring to FIGS. 10 and 11B, cavities 116 with different sizes are formed on the pre-base 108, thereby forming the base 110 (step S230). For example, the step of forming the base 110 may include a step of forming a first cavity 117, a second cavity 118 with lower size than that of the first cavity 117, and a third cavity 119 with lower than that of the second cavity 119, on the pre-base 108. Thus, the base 110 may be manufactured to include the plate 112 and the partition wall 114 which extends upwardly from the plate 112 and defines the cavities 116. Meanwhile, the lower electrode 132 may support the pre-base 132 at the time of a process for forming the cavities 116, e.g., etching process, and drill manufacturing process.

The colorant 120 may be disposed in the cavities 116 in a self-alignment manner. The step of disposing the colorant 120 may be performed in a way almost similar to the technology of disposing the colorant 120 which has been descried with reference to FIGS. 6A to 8B.

Referring to FIGS. 10 and 11C, the upper electrode 134 may be formed on the upper portion of the base 110 (step S250). The step of forming the upper electrode 134 may include a step of forming an electrode plate which corresponds to all the first to third electronic balls 122 to 126, on the upper portion of the base 110. Thus, the electrode part 130 may be formed with the lower electrode 132 and the upper electrode 134 disposed on each of the lower and upper portions of the base 110.

According to the method for manufacturing the color electronic paper display device in accordance with a modified embodiment of the present invention, it is possible to dispose the lower electrode 132 on the lower portion of the pre-base 108 before the cavities 116 are formed on the pre-base 108. Therefore, in the step of forming the cavities 116 on the pre-base 108, the lower electrode 132 supports the pre-base 108, so that it is possible to prevent damage of the pre-base 108, or failure of shapes or locations of the cavities 116.

Hereinafter, a detailed description will be given of various modified examples for the color electronic paper display device in accordance with one embodiment of the present invention. Herein, repeated description of the color electronic paper display device and the method for the same in accordance with one embodiment of the present invention will be omitted or simplified.

Figure 12:
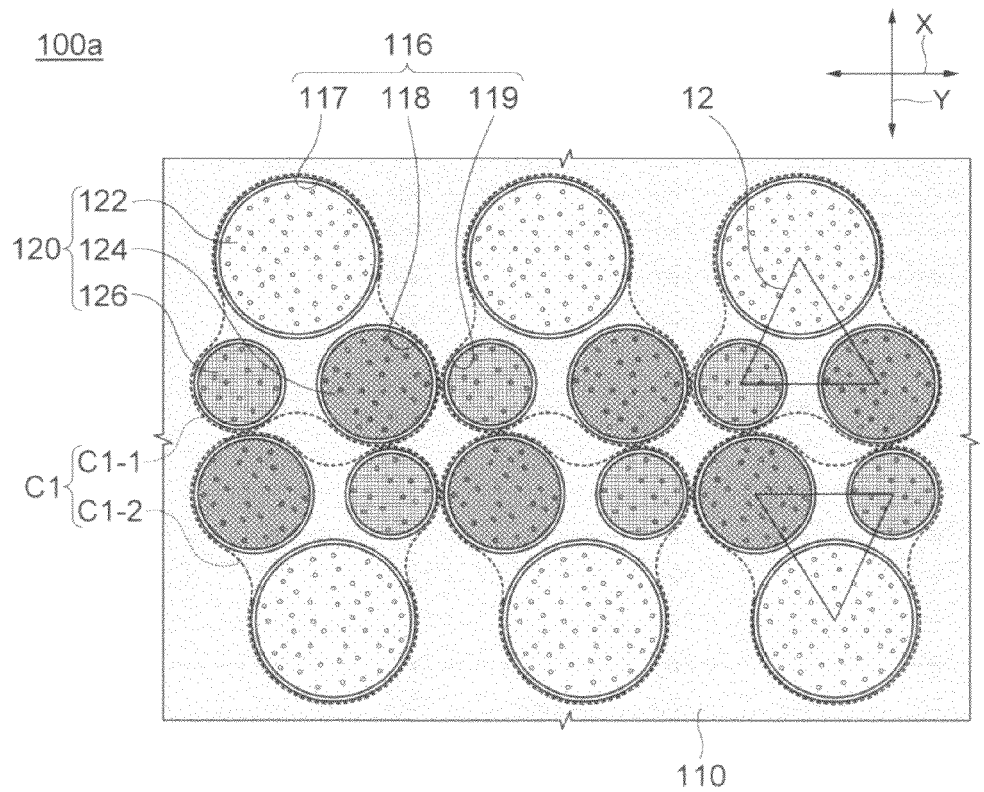
FIG. 12 is a view showing a modified example of the color electronic paper display device shown in FIG. 1.

FIG. 12 is a view showing a modified example of the color electronic paper display device shown in FIG. 1. Referring to FIG. 12, the color electronic paper display device 100a in accordance with one modified embodiment of the present invention may include colorant 120 which is disposed differently from that of the color electronic paper display device 100 shown in FIG. 1. For example, the colorant 120 may include first to third electronic balls 122 to 126 constituting one cell C1. When centers of the first to third electronic balls 122 to 126 within one cell C1 are interconnected to one another, the connection lines 12 may be formed in one triangle shape. The first electronic ball 122 may be disposed in inline along the first direction X. Also, the second and third electronic balls 124 and 126 may be alternatively disposed along the first direction X in a column different from that of the first electronic ball 122. The cell C1 may include first cells C1-1, and second cells C2-2 structured to be rotated by 180° than the first cells C1-1. That is, the cell C1 may be iteratively disposed along a first direction X. The first cells C1-1 and the second C1-2 are alternatively disposed in the first and second directions X and Y.

Figure 13:
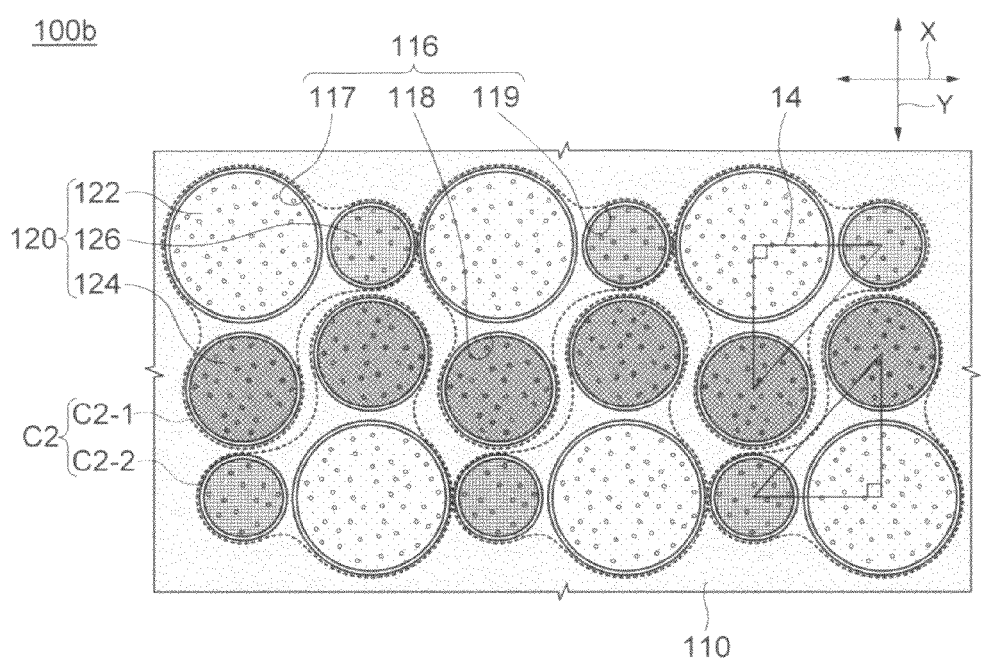
FIG. 13 is a view showing other modified example of the color electronic paper display device shown in FIG. 1.

FIG. 13 is a view showing other modified example of the color electronic paper display device shown in FIG. 1. Referring to FIG. 13, the color electronic paper display device 100b in accordance with other modified example of the present invention may have a colorant 120 which is disposed differently from that of the color electronic paper display device 100 shown in FIG. 10. For example, the colorant 120 may include first to third electronic balls 122 to 126 constituting one cell C1. When centers of the first to third electronic balls 122 to 126 within one cell C1 are interconnected to one another, the connection lines 14 may be formed in a triangle shape. Herein, the connection lines 14 may be largely a right-angled triangle. Thus, a line connecting the centers of the first and second electronic balls 122 and 124 and a line connecting the centers of the first and third electronic balls 122 and 126 are largely perpendicular to each other. The first and third electronic balls 122 and 126 may be alternatively disposed along the first direction X in an iterative manner. Also, the second electronic ball 124 may be mostly disposed along the first direction X in a column different from those of the first and third electronic balls 122 and 126. Thus, the cell C2 may include first cells C2-1, and cells with the second pattern C2-2 which are structured to be rotated by 180° than the first cells C2-1 with the first pattern. The cells C2-1 with the first pattern may be disposed along the first direction X so that it has the repeated patterns. In the second direction Y perpendicular to the first direction X, the first cells C2-1 and the second cells C2-2 may be alternatively disposed in an iterative manner. Herein, the first cells C2-1 and the second cells C2-2 may be disposed to have an interdigited configuration, so that it is possible to reduce intervals between the first and second cells C2-1 and C2-2.

Figure 14:
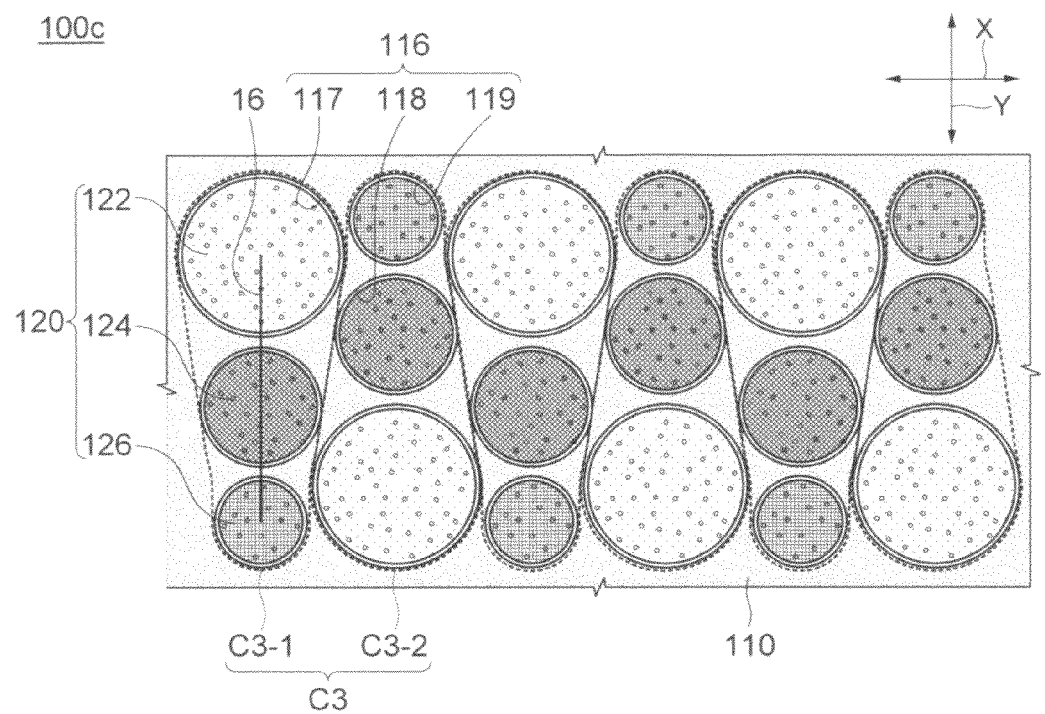
FIG. 14 is a view showing other modified example of the color electronic paper display device shown in FIG. 1.

FIG. 14 is a view showing other modified example of the color electronic paper display device shown in FIG. 1. Referring to FIG. 14, the color electronic paper display device 100c in accordance with other modified example of the present invention may have a colorant 120 which is disposed differently from that of the color electronic paper display device 100 shown in FIG. 1. For example, the colorant 120 may include first to third electronic balls 122 to 126 constituting one cell C3. When centers of the first to third electronic balls 122 to 126 within one cell C3 are interconnected to one another, the connection lines may be placed on one line 16. The cell C3 may include first cells C3-1 and second cells C3-2 which are rotated by rotated by 180° than the first cells C3-1. The first and second cells C3-1 and C3-2 may be alternatively disposed along the first direction X. In addition, the first and second cells C3-1 and C3-2 may be iteratively disposed along the second direction Y which is mostly perpendicular to the first direction X.

Figure 15:
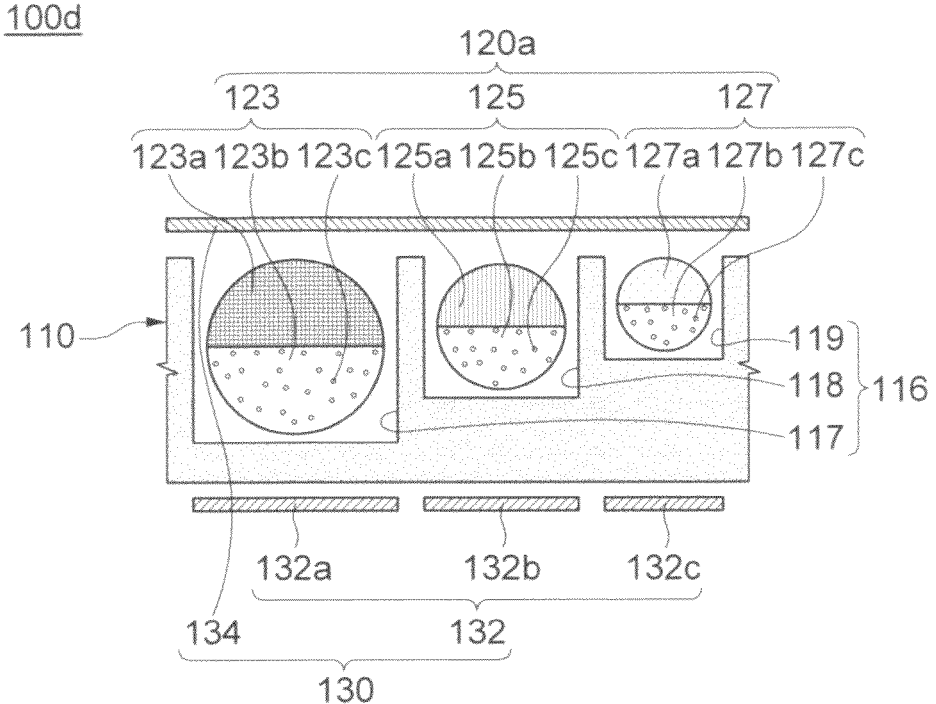
FIG. 15 is view showing one modified example of the color electronic paper display device shown in FIG. 2.

FIG. 15 is view showing one modified example of the color electronic paper display device shown in FIG. 2. Referring to FIG. 15, the color electronic paper display device 100d may have a colorant 120a with a structure different from that of the color electronic paper display device 100 shown in FIG. 2. In particular, even if colors belong to the identical series, they may have different reflectance depending on the types of pigments. When electronic balls with two kinds of colors are used, reflection amounts of all electronic balls may be changed by combination of the colors with two kinds. The reflection amounts of the electronic balls may be also changed according to addition rates of fluorescence pigments. In consideration of these factors, the color electronic paper display device 100d may have electronic balls which have colors and fluorescence pigment arrangement which differ from those of the color electronic paper display device 100. For example, the color electronic paper display device 100d may have a base 110 provided with the first to third cavities 117 to 119, and fourth to sixth electronic balls 123 to 127 which are sequentially disposed in the first to third cavities 117 to 119. The fourth electronic ball 123 may be constituted by a red hemisphere 123a and a white hemisphere 123b which are electrified into different charges. The fifth electronic ball 125 may be constituted by a green hemisphere 125a and a white hemisphere 125b which are electrified into different charges. The sixth electronic ball 127 may be constituted by a blue hemisphere 127a and a white hemisphere 127b which are electrified into different charges. When the electrode part 130 provided with the lower and upper electrodes 132 and 134 constituted by the first to third electrodes 132a to 132c selectively applies voltages, the fourth to sixth electronic balls 123 to 127 may be individually operated. Meanwhile, the fourth to sixth electronic balls 123 to 127 may further include fluorescence pigments 123c to 127c. For example, the fluorescence pigments may be provided to the white hemispheres 123b to 127 which have relatively higher reflectance that those of the red, green, and blue hemispheres 123b to 127b. The fluorescence pigments 123c to 127c may be white-based fluorescence pigments. Thus, the white hemispheres 123b to 127b may have relatively increased reflectance than those of the red, green, and blue hemispheres 123a to 127a. Also, the fourth to sixth electronic balls 123 to 127 are adjusted to have different sizes so that they have the same reflection amounts as one another. The color electronic paper display device 100d with the above-described structure can implement a black color by combination of the red, green, and blue hemispheres 123a to 127a, and implement a white color by combination of the white hemispheres 123b to 127b. Also, the fluorescence pigments 123c to 127c are provided to the white hemispheres 123b to 127b, so that it is possible to increase reflectance of the white hemispheres in comparison with the red, green and blue hemispheres 123a to 127a. Thus, the color electronic paper display device 100d can implement a brighter white color, and increase contrast of black and white and clarity.

Figure 16:
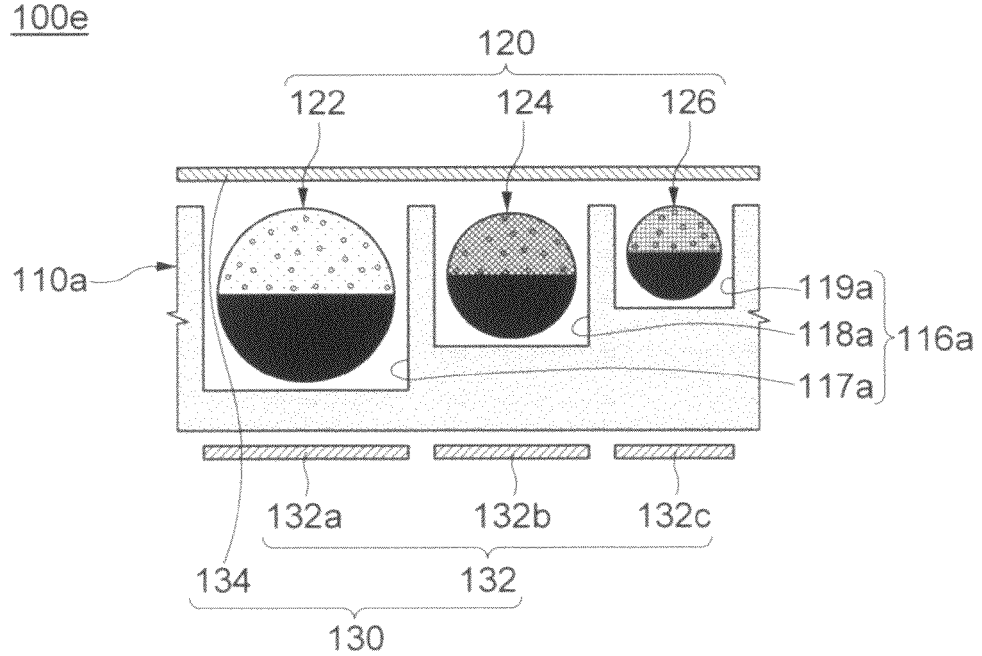
FIG. 16 is view showing other modified example of the color electronic paper display device shown in FIG. 2.

FIG. 16 is view showing other modified example of the color electronic paper display device shown in FIG. 2. Referring to FIG. 16, the color electronic paper display device 100e may have a base 110a with cavities 116a different from that of the color electronic paper display device 100 shown in FIG. 2. For example, the color electronic paper display device 100e may have a base 110a with the fourth to sixth cavities 117a to 119a, and first to third electronic balls 122 to 126 which are sequentially disposed in the fourth to sixth cavities 117a to 119a. The fourth to sixth cavities may have the same depth as one another. When the electrode part 130 provided with the lower and upper electrodes 132 and 134 constituted by the first to third electrodes 132a to 132c selectively applies voltages, the fourth to sixth electronic balls 123 to 127 may be individually operated.

The color electronic paper display device 100e with the above-described structure may have the base 110a on which the fourth to sixth cavities 117a to 119a are formed to have the same depth as one another. In this case, the color electronic paper display device 100e can simplify processes for forming the cavities 116 which are used for arrangement of the first to third electronic balls 122 to 126 with mutually different sizes. For example, it is possible to form the fourth to sixth cavities 117a to 119a by one-time photoresist etching process. Alternatively, it is possible to form the fourth to sixth cavities 117a to 119a by one-time laser and mechanical drill manufacturing processes.

Figure 17:
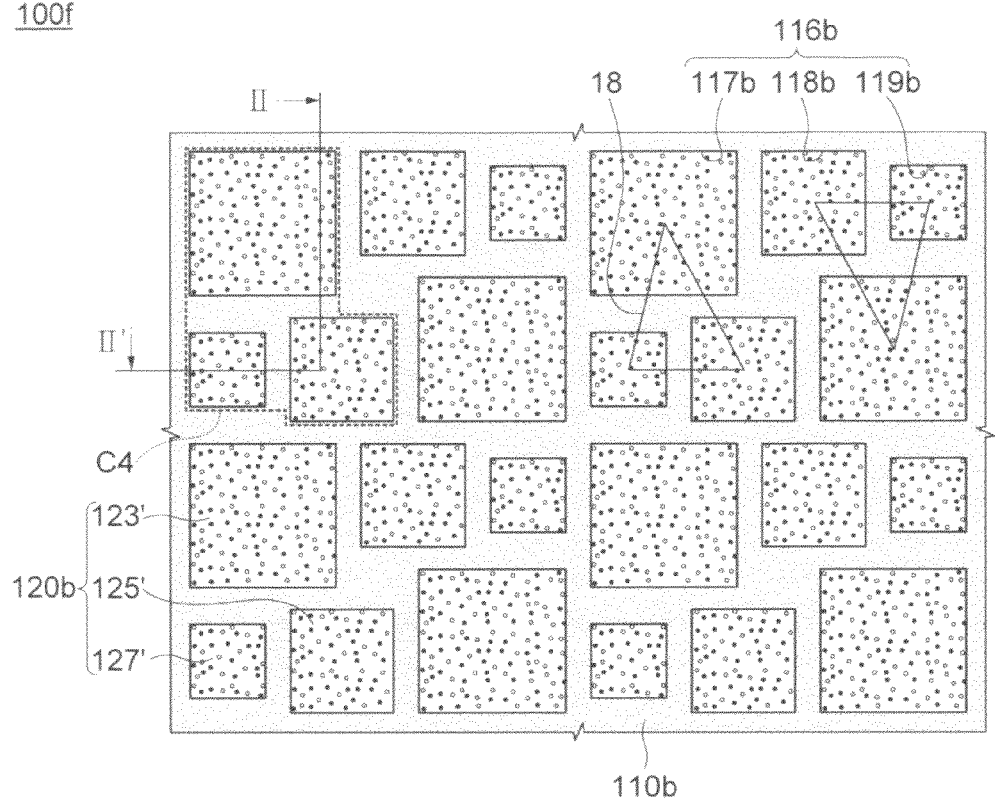
FIG. 17 is a view showing other modified example of the color electronic paper display device shown in FIG. 1.
Figure 18:
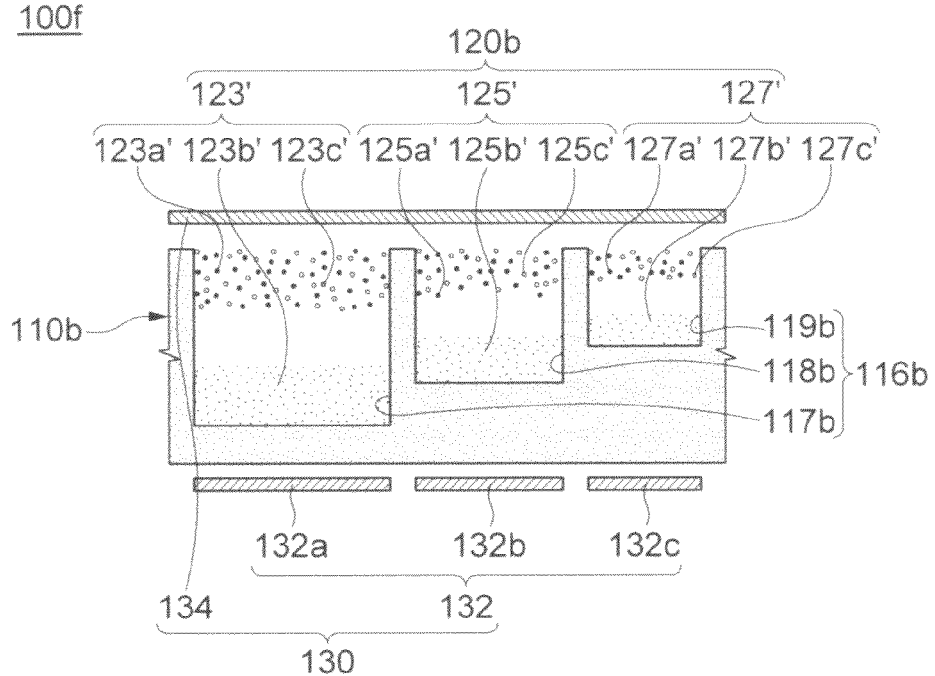
FIG. 18 is a cross-sectional view the device taken along the line II-II' of FIG. 17.

FIG. 17 is a view showing other modified example of the color electronic paper display device shown in FIG. 1. FIG. 18 is a cross-sectional view the device taken along the line II-II' of FIG. 17. Referring to FIGS. 17 and 18, the color electronic paper display device 100f in accordance with another embodiment of the present invention may have an electronic paper structure employing an electrophoretic scheme. For example, the color electronic paper display device 100f may have a base 110b with cavities 116b, a colorant 120b disposed in the cavities 116b, an electrode part 130.

The seventh to ninth cavities 117b to 119b may be formed on the base 110. The seventh to ninth cavities 117b to 119b may mostly have cross-section of a quadrangle. In addition, the seventh 117b may have volume larger than that of the eighth cavity 118b, and the eighth cavity 118b may have volume larger than that of the ninth cavity 119b.

The colorant 120b may have light-transmissive fluid, and first to third electrophoretic fluid 123' to 127' containing certain pigment particles infused into the light-transmissive fluid. The pigment particles may be provided to float within the first to third electrophoretic fluid 123' to 127'. The first to third electrophoretic fluid 123' to 127' may be disposed into the seventh to ninth cavities 117b to 119b in order. Thus, the first electrophoretic fluid 123' may have volume larger than that of the second electrophoretic fluid 125', and the second electrophoretic fluid 125' may have volume larger than that of the third electrophoretic fluid 127'. The first electrophoretic fluid 123' may contain blue particles 123a' and black particles 123b' which are electrified into different charges. The second electrophoretic fluid 125' may contain yellow particles 125a' and black particles 125b' which are electrified into different charges. The third electrophoretic fluid 127' may contain red particles 127a' and black particles 127b' which are electrified into different charges. Meanwhile, when centers of the first to third electrophoretic fluid 123' to 127' are interconnected to one another, the connection lines may be largely formed in a triangle shape.

Further, the first to third electrophoretic fluid 123' to 127' may further include certain fluorescence pigments infused into the light-transmissive fluid. The fluorescence pigment may be provided to float within the light-transmissive fluid. The blue-based fluorescence pigment (hereinafter, referred to as 'blue fluorescence pigment 123c') may be further provided to the first electrophoretic fluid 123'. The yellow-based fluorescence pigment (hereinafter, referred to as 'yellow fluorescence pigment 125c') may be provided to the second electrophoretic fluid 125'. The red-based fluorescence pigment (hereinafter, referred to as 'red fluorescence pigment 127c') may be provided to the third electrophoretic fluid 127'. Thus, the first to third electrophoretic fluid 123' to 127' may be provided with blue, yellow, and red pigment particles 123a' to 127a' having the reflectance improved than that of the black particles 123b' to 127b'. Meanwhile, the fluorescence pigments may be electrified into charges in such a manner that they have the same polarity as those of the pigments on the identical series from among the pigment particles. For example, the blue, yellow, and red fluorescence pigments 123c' to 127c' may be electrified into charges in such a manner that they have the same polarity as those of the blue, yellow, and red pigment particles 123a' to 127a.

The electrode part 130 may include a lower electrode which is disposed on one side of the base 110b, and an upper electrode 134 which is disposed on the other side of the base 110b. Any one of the lower and upper electrodes may be a positive electrode, and the other of them may be a negative electrode. The lower electrode 132 may include a first electrode 132a, a second electrode 132b, and a third electrode 132c. The first electrode 132a may be disposed to correspond to the first electrophoretic fluid 123', and the second electrode 132b may be disposed to correspond to the second electrophoretic fluid 125', and the third electrode 132c may be disposed to correspond to the third electrophoretic fluid 127'. The upper electrode 134 may be disposed to correspond to all the first to third electrophoretic fluid 123' to 127'. For example, the upper electrode 134 may be provided as an electrode plate which faces a front surface of the base 110.

When the electrode part 130 selectively applies voltages to the first to third electrophoretic fluid 123' to 127', the electrode part 130 can individually switch the first to third electrophoretic fluid 123' to 127'. For example, when voltages are applied to the first and second electrodes 132a to 134b, particles within the first electrophoretic fluid 123' (that is, blue pigment particles 123a') which are electrified to have the same polarity as that of the first electrode 132a and the blue fluorescence pigment 123c' may be moved toward the second electrode 124. At the same time, particles within the first electrophoretic fluid 123' (that is, black particles 123b') which are electrified to have a polarity different from that of the first electrode 132a may be moved toward the first electrode 132a. Thus, voltages are selectively applied to the first electrode 132a and the upper electrode 134, so that it is possible to switch the first to third electrophoretic fluid 123'. In such a way, the electrode part 130 selectively applies voltages to the second and third electrodes 132b and 132c, and the upper electrode 134, so that it is possible to switch the second to third electrophoretic fluid 125' to 127' in the above-described manner.

The color electronic paper display device 100f with the above-described structure may have a structure where the first to third electrophoretic fluid 123' to 127' are controlled to have different sizes so that they have the same reflectance as one another. Thus, the color electronic paper display device 100f is provided with the first to third electrophoretic fluid 123' to 127' with different sizes, so that it is possible to achieve an electronic paper structure driven in an electrophoretic scheme.

Also, the color electronic paper display device 100f has the first to third electrophoretic fluid 123' to 127' to which the fluorescence pigments 123c' to 127c' representing certain colors are added at the time of absorbing UV rays, so that it is possible to improve reflectance of the colorant 120b. Thus, the color electronic paper display device 100f in accordance with another modified embodiment of the present invention improves reflectance of the first to third electrophoretic fluid 123' to 127', thereby enhancing brightness and contrast ratio of black and white.

Hereinafter, a detailed description will be given of a color electronic paper display device in accordance with other embodiment of the present invention. Hereinafter, repeated description of the color electronic paper display device 100 in accordance with one embodiment of the present invention as described above may be omitted or simplified.

Figure 19:
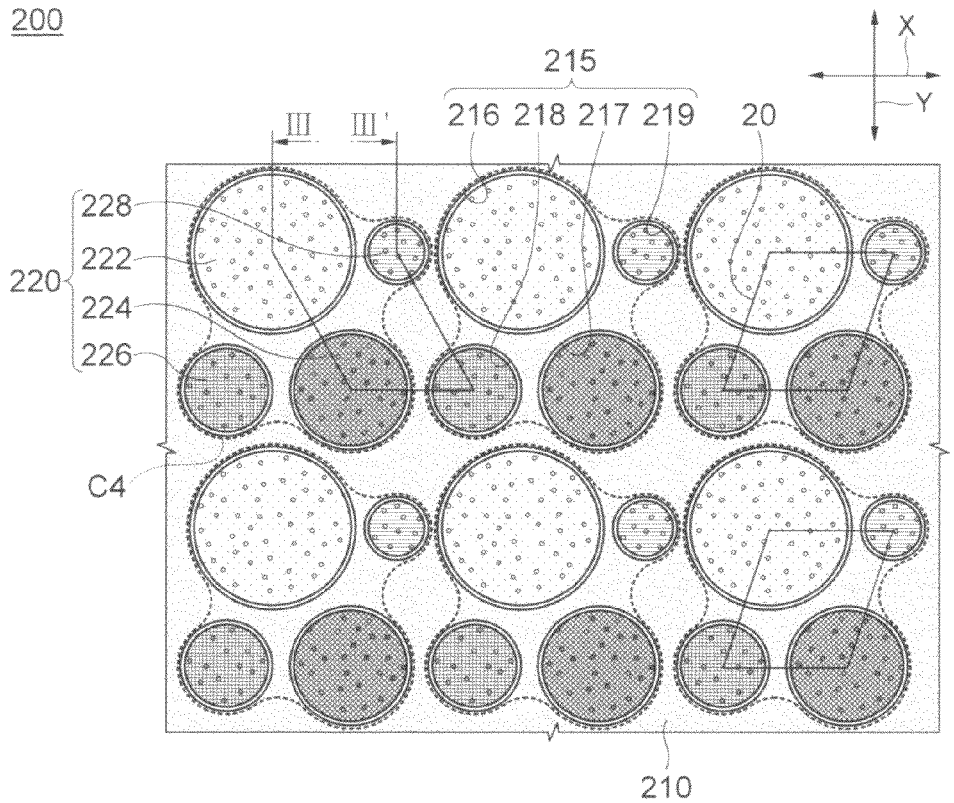
FIG. 19 is a top view showing a color electronic paper display device in accordance with other embodiment of the present invention.
Figure 20:
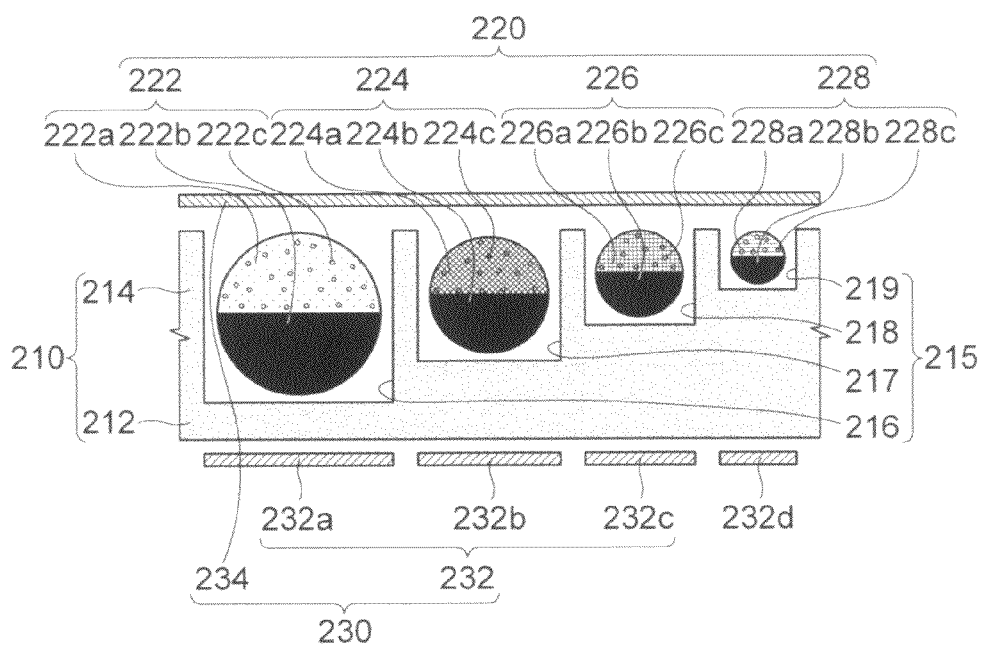
FIG. 20 is a cross-sectional view the device taken along the line III-III' of FIG. 19.

FIG. 19 is a top view showing a color electronic paper display device in accordance with other embodiment of the present invention. FIG. 20 is a cross-sectional view the device taken along the line III-III' of FIG. 19. Referring to FIGS. 19 and 20, the color electronic paper display device 200 in accordance with other embodiment of the present invention may include a base 210, a colorant 220, and an electrode part 230.

The base 210 may have a plate 212, and a partition wall 214 extending upward from the plate 212. By the partition wall 214, the base 210 may have a plurality of cavities 215 each of which is defined into an opened upper portion, a side surface, and a lower surface. For example, the cavities 215 may have a first cavity 216, a second cavity 217, a third cavity 218, and a fourth cavity 219 each of which has the different sizes from one another. Each of the first to fourth cavities 216 to 219 may have a cross-section corresponding to the colorant 220. The first to fourth cavities 216 to 219 may have sizes large in order of them The colorant 220 may be disposed on the plate 212 to be partitioned by the partition wall 214. For example, the colorant 220 may be disposed to be partitioned on the plate 212 by the partition wall 114. The colorant 220 may include a first electronic ball 222, a second electronic ball 224, a third electronic ball 226, and a fourth electronic ball 228 all of which are partitioned by the partition wall 214. Each of the first to fourth electronic balls 222 to 228 may be disposed sequentially on the first to fourth cavities 216 to 219. Thus, as shown in FIG. 17, the first to fourth electronic balls 222 to 228 may be disposed on the base 210 to occupy an area with a different size for each of them.

Each of the first to fourth electronic balls 222 to 228 is constituted by hemispheres having colors different from each other. Also, each of the first to fourth rd electronic balls 222 to 228 may be constituted by hemispheres electrified into different charges from each other. For example, the first electronic ball 222 may be constituted by a white hemisphere 222a and a black hemisphere 222b, the second electronic ball 224 may be constituted by a blue hemisphere 224a and a black hemisphere 224b, the third electronic ball 226 may be constituted by a yellow hemisphere 226a and a black hemisphere 226b, and the fourth electronic ball 228 may be constituted by a red hemisphere 228a and a black hemisphere 228b. The white, blue, yellow, and red hemispheres 222a to 228a may be electrified into charges different from those of the black hemispheres 222b to 228b.

Meanwhile, the first to fourth electronic balls 222 to 228 may be controlled to have the same reflection amount as one another. As described above, the pigments have reflectance depending on their types, and the size of the colorant 220 may be inversely proportional to the reflectance of pigments. In consideration of these factors, the first to fourth electronic balls 222 to 228 may have sizes large in order of them, so that the colorants 220 have the same reflection amounts as one another.

The colorants 220 may be provided to achieve a planar arrangement in which it is possible to minimize intervals between the first to fourth electronic balls 222 to 228. For example, as shown in FIG. 17, when centers of the first to fourth electronic balls 222 to 228 are interconnected to one another, the first to fourth electronic balls 222 to 228 may be disposed on plane so that the connection lines are in one quadrangle shape. The quadrangle made by the lines 20 may include variety of shapes, such as a square, a rectangle, a trapezoid, a parallelogram, and a diamond shape. Also, the cell C4 may be iteratively disposed on the base 210 in such a manner that the first to fourth electronic balls 222 to 228 have minimum intervals therebetween. That is, the cell C4 may be disposed to have a repeated pattern shape along a first direction X and a second direction Y almost perpendicular to the first direction X.

Also, the colorants 220 may further include certain fluorescence pigments. For example, the fluorescence pigments may include white, blue, yellow and red fluorescence pigments 222c to 228c which are sequentially provided to the white, blue, yellow, and red hemispheres 222a to 228a. As for the fluorescence pigment, at least one of C.I.Acid yellow, C.I.Basic orange, C.I.acid red, eosin, Cu-added ZnS, Mn-added ZnS, Ag-added ZnS, Bi-added ZnS, fluorescein, tungsten acid calcium:CaWO4, tungsten acid magnesium: MgWO4, ZnSiO3-Mn, CdSiO2-Mn, CdB2O5, and CdB2O5 may be used. The electrode part 230 may be a transparent electrode with light transmission. The electrode part 230 may include a lower electrode 232 which is disposed on one side of the base 210, and an upper electrode 234 which is disposed on the other side of the base 210. The lower electrode 232 may include first to fourth electrodes 232a to 232d. The first to fourth electrodes 232a to 232d may be sequentially disposed to correspond to the first to fourth electronic balls 222 to 228, respectively. The upper electrode 234, which is provided as an electrode plate facing the base 110, may be disposed to correspond to all the first to fourth electronic balls 222 to 228.

The color electronic paper display device 200 with the above-described structure may include colorants 220 each of which has first to fourth electronic balls 222 to 228 that have been controlled to have the same reflectance as one anther. The color electronic paper display device 200 have a structure where the colorants 220 are disposed on plane in such a manner that the first to fourth electronic balls 222 to 228 have minimum intervals therebetween. Also, the color electronic paper display device 200 can improve reflectance of the colorants 220 by being provided with the first to fourth electronic balls 222 to 228 having the fluorescence pigments 222a to 228a added thereto. Thus, the color electronic paper display device 200 in accordance with other embodiment of the present invention can uniformize the reflection amounts of the colorants 220, thereby representing a white color enough to be close a pure white, and to improve contrast of black and white, clarity, color expressiveness, and brightness.

Continuously, a detailed description will be given of a color electronic paper display device in accordance with other embodiment of the present invention. Herein, repeated description of the above-mentioned color electronic paper display device will be omitted or simplified.

Figure 21:
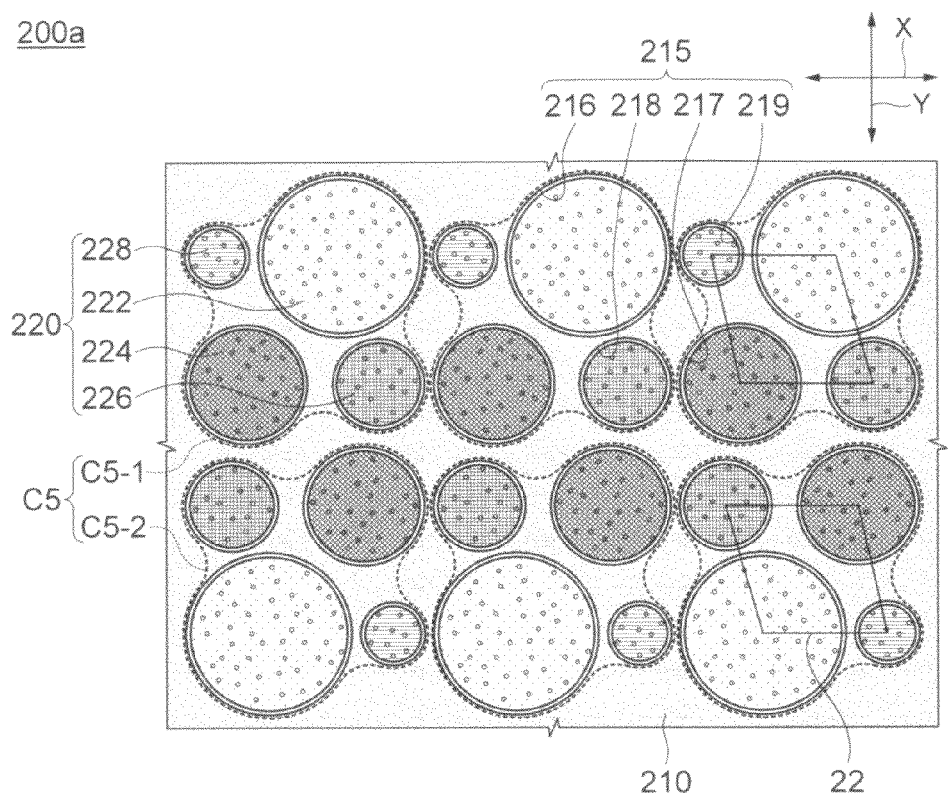
FIG. 21 is a view showing a modified example of the color electronic paper display device shown in FIG. 19.

FIG. 21 is a view showing a modified example of the color electronic paper display device shown in FIG. 19. Referring to FIG. 21, the color electronic paper display device 200a may have a colorant 220 with arrangement different from that of the color electronic paper display device 200 shown in FIG. 19. For example, the colorant 220 may include first to fourth electronic balls 222 to 228 constituting one cell C5. When centers of the first to fourth electronic balls 222 to 228 within one cell C5 are interconnected to one another, the connection lines 22 may be formed in a quadrangle shape. The quadrangle may have almost a diamond shape. The first electronic ball 222 and the fourth electronic ball 228 may be alternatively disposed along the first direction X in an iterative manner. Also, the second and third electronic balls 224 and 226 may be alternatively disposed along the first direction X in a column different from those of the first and fourth electronic balls 222 and 228 in an iterative manner. The cell C5 may include first cells C5-1, and second cells C5-2 structured to be rotated by 180° than the first cells C5-1. That is, the cell C5-1 may be disposed to have repeated patterns along a first direction X. The first cells C5-1 and the second C5-2 are alternatively disposed in second direction Y perpendicular to the first direction X.

Figure 22:
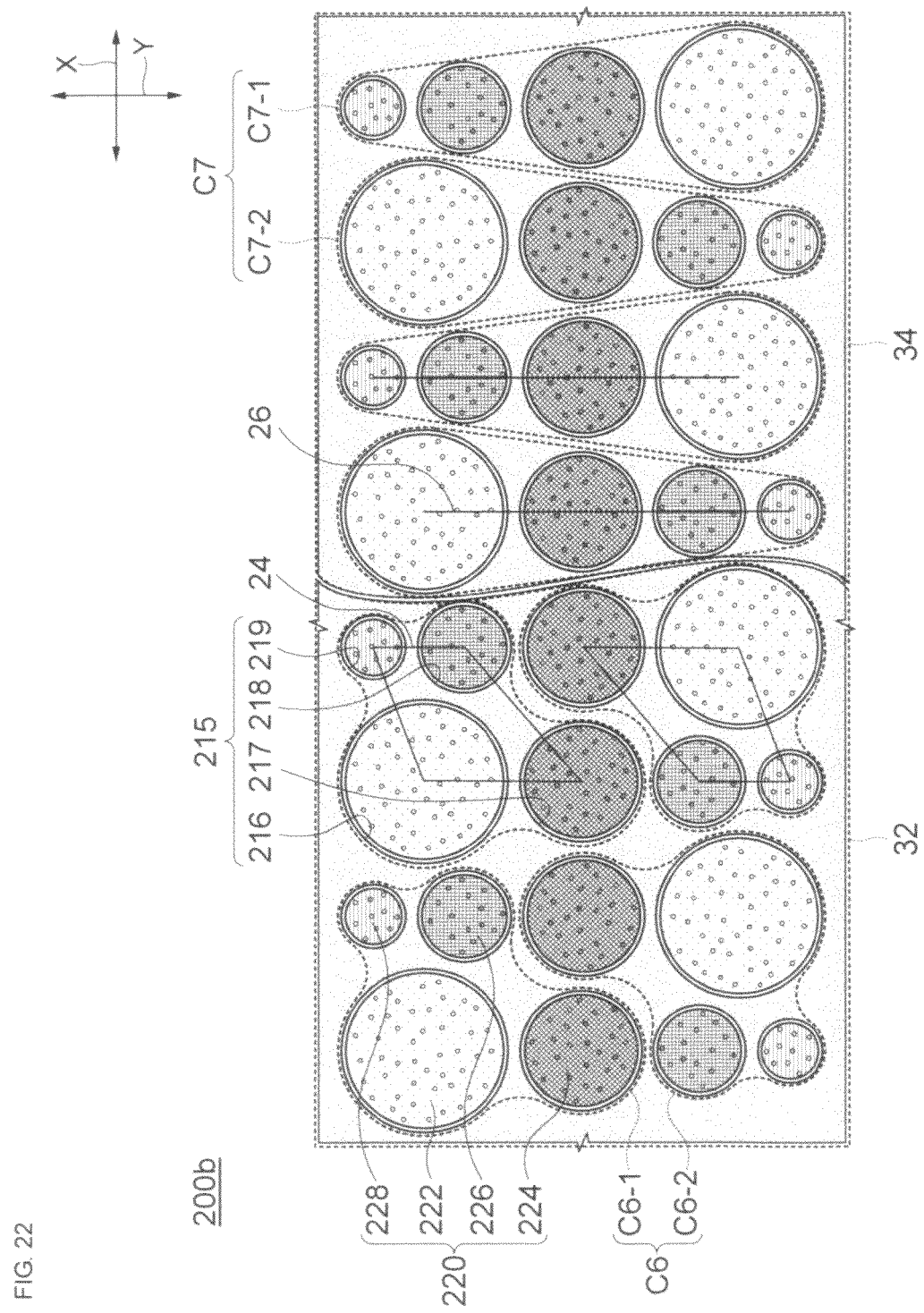
FIG. 22 is a view showing other modified example of the color electronic paper display device shown in FIG. 19.

FIG. 22 is a view showing other modified example of the color electronic paper display device shown in FIG. 19. Referring to FIG. 22, the color electronic paper display device 200b may have a colorant 220 with arrangement different from that of the color electronic paper display device 200 shown in FIG. 19. For example, as in a left side 32 of the color electronic paper display device 200b shown in FIG. 20, the colorant 220 may include first to fourth electronic balls 222 to 228 constituting one cell C6. When centers of the first to fourth electronic balls 222 to 228 within one cell C6 are interconnected to one another, the connection lines 24 may be formed in a quadrangle shape. The cell C6 may include first cells C6-1, and second cells C6-2 structured to be rotated by 180° than the first cells C6-1. The cell C6-1 may be disposed along a first direction X in an iterative manner. The first cells C6-1 and the second cells C6-2 are alternatively disposed in second direction Y perpendicular to the first direction X. Herein, the first cells C6-1 and the second cells C6-2 are disposed to have an interdigited configuration, thereby reducing intervals between the first and second cells C6-1 and C6-2. Another example, as in a right side 34 of the color electronic paper display device 200c shown in FIG. 22, the colorant 220 may include first to fourth electronic balls 222 to 228 constituting one cell C7. The centers of the first to fourth electronic balls 222 to 228 within one cell C6 may be placed along one line 26. The cell C7 may include first cells C7-1, and second cells C7-2 structured to be rotated by 180° than the first cells C7-1. The first and second cells C7-1 and C7-2 may be disposed along a first direction X in an iterative manner.

Figure 23:
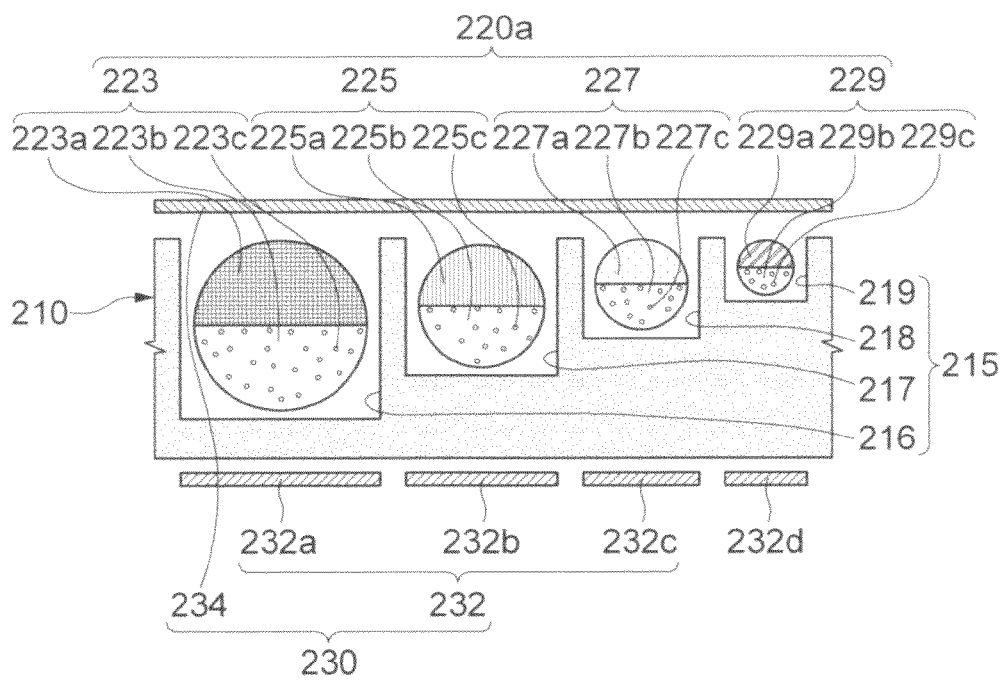
FIG. 23 is a view showing one modified example of the color electronic paper display device shown in FIG. 20.

FIG. 23 is a view showing one modified example of the color electronic paper display device shown in FIG. 20. Referring to FIG. 23, the color electronic paper display device 200c may have a colorant 220 with arrangement different from that of the color electronic paper display device 200 shown in FIG. 20. The color electronic paper display device 200c may have a colorant 220a which is constituted by electronic balls with colors and fluorescence pigments different from those of the color electronic paper display 200 shown in FIG. 20. For example, the color electronic paper display device 200c may include a base 210 with cavities 215 including first to fourth cavities 216 to 219, and fifth to eighth electronic balls 223 to 229 disposed sequentially in the first to fourth cavities 216 to 219. The fifth electronic ball 223 may be constituted by a black hemisphere 223a and a white hemisphere 223b that are electrified into charges different from each other. The sixth electronic ball 225 may be constituted by a red hemisphere 225a and a white hemisphere 225b that are electrified into charges different from each other. The seventh electronic ball 227 may be constituted by a green hemisphere 227a and a white hemisphere 227b that are electrified into charges different from each other. The eighth electronic ball 229 may be constituted by a blue hemisphere 229a and a white hemisphere 229b that are electrified into charges different from each other. Meanwhile, the fifth to eighth electronic balls 223 to 229 may further include fluorescence pigments 223c to 229c. The fluorescence pigments 223c to 229c may be provided to the white hemispheres 223b to 229b. The fluorescence pigment may be a white-based fluorescence pigment. Thus, the white hemispheres 223b to 229b may have reflectance improved by the black, red, green, and blue hemispheres 223a to 229a. Also, the size of the colorant 220b is adjusted such that each of the fifth to eighth electronic balls 223 to 229 has the same reflection amount as one another. When the electrode part 230 provided with the lower and upper electrodes 232 and 234 constituted by the first to fourth electrodes 232a to 232d selectively applies voltages, the fifth to eighth electronic balls 223 to 229 may be individually operated. Herein, each of the fifth to eighth electronic balls 223 to 229 may have the same reflection amount as one another.

The color electronic display device 200c with the above-described structure can realize a black color by combination of the black, red, green, and blue hemispheres 223a to 229a, and realize a white color by combination of the white hemispheres 223b to 229b. Also, the fluorescence pigments 223c to 229c are provided to the white hemispheres 223b to 229b, so that the white hemispheres 223b to 229b have relatively higher reflectance than those of the black, red, green, and blue hemispheres 223a to 229a. Therefore, the color electronic display device 200c can make a white color lighter, and improve clarity and contrast ratio.

Figure 24:
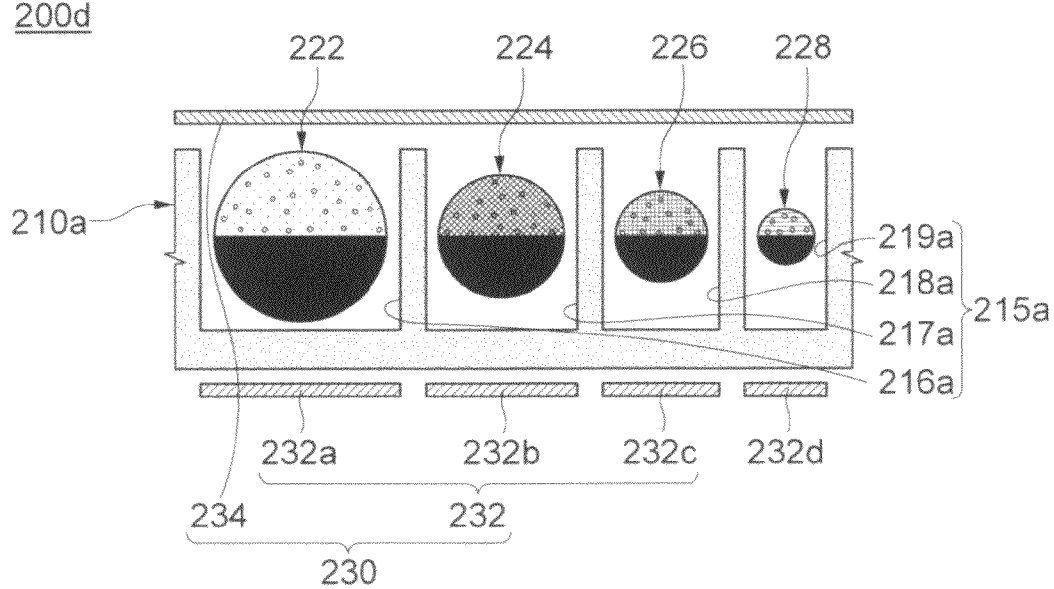
FIG. 24 is a view showing other modified example of the color electronic paper display device shown in FIG. 20.

FIG. 24 is a view showing other modified example of the color electronic paper display device shown in FIG. 20. Referring to FIG. 24, the color electronic paper display device 200d may have a base 110a with cavities 215a different from those of the color electronic paper display 200 shown in FIG. 20. For example, the color electronic paper display device 200d include a base 210a with first to fourth cavities 216a to 219a, and first to fourth electronic balls 222 to 228 disposed sequentially in the fifth to eighth cavities 216a to 219a. The fifth to eighth cavities 216a to 219a may have the same depth as one another. When the electrode part 230 provided with the lower and upper electrodes 232 and 234 constituted by the first to fourth electrodes 232a to 232d selectively applies voltages, the first to fourth electronic balls may be individually operated.

The color electronic display device 200d with the above-described structure may be provided with the base 210a including fifth to eighth cavities 216a to 219a formed to have the same depth as one another. In this case, the color electronic display device 200d can simplify a process of forming the cavity 216 in which the first to fourth electronic balls 222 to 228 are disposed to have different sizes from one another. For example, the fifth to eighth cavities 216a to 219a may be formed by one-time performing any one of a photoresist etching process, a laser drill process, and a mechanical drill process.

Figure 25:
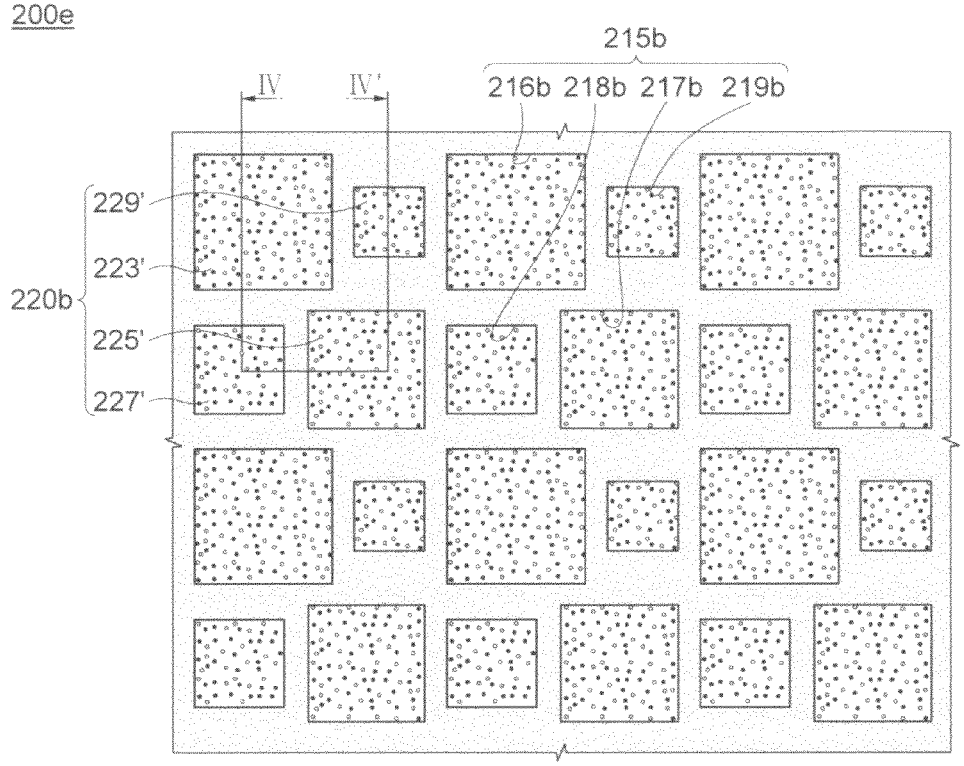
FIG. 25 is a view showing other modified example of the color electronic paper display device shown in FIG. 19.
Figure 26:
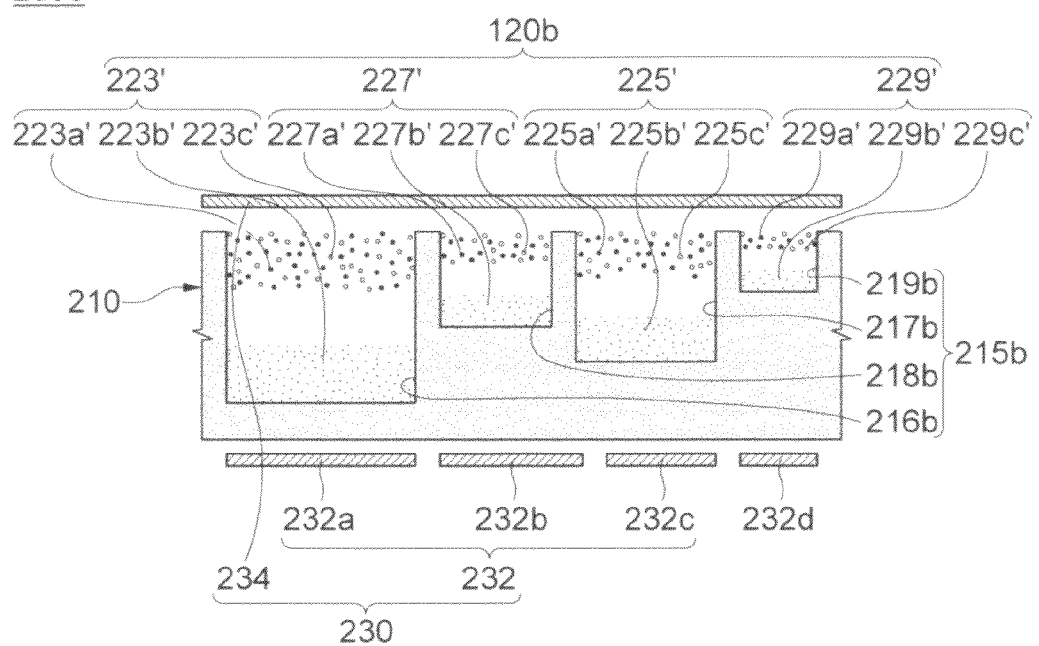
FIG. 26 is a cross-sectional view of the device taken along the line IV-IV' of FIG. 25.

FIG. 25 is a view showing other modified example of the color electronic paper display device shown in FIG. 19. FIG. 26 is a cross-sectional view the device taken along the line N-N' of FIG. 25.

Referring to FIGS. 25 and 26, the color electronic paper display device 200e in accordance with other modified example of the present invention may have a structure of an electronic paper display device employing an electrophoretic scheme. On the base 210b, ninth to twelfth cavities 216b to 219b having a cross-section of a quadrangle may be formed. In addition, the ninth to twelfth cavities 216b to 219b may have volume large in order from the cavities.

The colorant 220b may have light-transmissive fluid, and first to fourth electrophoretic fluids 223' to 229' containing certain pigment particles infused into the light-transmissive fluid. The pigment particles may be provided to float within the first to fourth electrophoretic fluids 223' to 229'. The first to fourth electrophoretic fluid 223' to 229' may be disposed sequentially at the ninth to twelfth cavities 216b to 219b. The first electrophoretic fluid 223' may contain white pigment particles 223a' and black pigment particles 223b' which are electrified into different charges. The second electrophoretic fluid 225' may contain blue pigment particles 225a' and black pigment particles 225b' which are electrified into different charges.

The third electrophoretic fluid 227' may contain yellow pigment particles 227a' and black pigment particles 227b' which are electrified into different charges. The fourth electrophoretic flue 229' may contain red pigment particles 229a' and black pigment particles 229b' which are electrified into different charges. Meanwhile, the first to fourth electrophoretic fluids 223' to 229' may further contain certain fluorescence pigments infused into the light-transmissive fluid. For example, a white-based fluorescence pigment (hereinafter, referred to as 'white fluorescence pigment 223c') may be further provided to the first electrophoretic fluid 223', and the blue-based fluorescence pigment (hereinafter, referred to as 'blue fluorescence pigment 225c') may be further provided to the second electrophoretic fluid 225'. A yellow-based fluorescence pigment (hereinafter, referred to as 'yellow fluorescence pigment 227c') may be further provided to the third electrophoretic fluid 227', and the red-based fluorescence pigment (hereinafter, referred to as 'red fluorescence pigment 229c') may be further provided to the fourth electrophoretic fluid 229'. The white, blue, yellow, and red fluorescence pigments 223c' to 229c' may be electrified to have the same polarity as those of the white, blue, yellow, and red pigment particles 223a' to 229a'.

The electrode part 230 may include a lower electrode 232 disposed on one side of the base 210b, and the upper electrode 234 disposed on the other side of the base 210b. the lower electrode 232 may include first to fourth electrodes 232a to 232d disposed to correspond to the first to fourth electrophoretic fluids 223' to 229'. The upper electrode 234 may be formed as an electrode plate facing the front surface of the base 210b. The electrode part 230 can selectively apply voltages to the first to fourth electrophoretic fluids 223' to 229', thereby individually switching the first to fourth electrophoretic fluids 223' to 229'. A process of switching the colorant 220b by the electrode part 230 may have almost the same features as described with referent to FIGS. 15 and 16. Therefore, the white, blue, yellow, and red fluorescence pigments 223c' to 229c' may be moved together with the white, blue, yellow, and red pigment particles 223a' to 229a' within the light-transmissive fluid by the electrode part 230.

The color electronic paper display device 200e may have a structure where the size of the colorant 220b is adjusted such that the first to fourth electrophoretic fluids 223' to 229' have the same reflectance as one another. Thus, the color electronic paper display device 200e is provided with the first to fourth electrophoretic fluids 223' to 229', so that it has a structure of an electronic paper driven in an electrophoretic scheme. Also, the color electronic paper display device 200e is provided with the first to fourth electrophoretic fluids 223' to 229' having the fluorescence pigments for representing a specific color through absorption of UV rays, thereby improving reflectance of the colorant 220b.

Thus, in the color electronic paper display device 200e in accordance with other modified embodiment of the present invention, increase in reflectance of the first to fourth electrophoretic fluids 223' to 229' can increase brightness and contrast ratio.

According to the color electronic paper display device of the present invention, colorants with different reflectance by different kinds of pigments are formed to have different sizes, thereby uniformize reflection amount of each colorant. Thus, it is possible to improve clarity, color expressiveness, and brightness characteristics by uniform reflectance amount of colorants.

The color electronic paper display device of the present invention is provided with colorants with different sizes, thereby achieving a planar arrangement structure in which it is possible to minimize intervals therebetween them. Thus, it is possible to enhance clarity, color expressiveness, and brightness characteristics through minimum intervals between the colorants.

Also, the color electronic paper display device of the present invention is provided with colorants with different fluorescence pigments, thereby improving reflectance amount of the colorant. Thus, it is possible to enhance clarity, color expressiveness, and brightness characteristics by increase in reflectance amount of colorants.

In a method for manufacturing the color electronic paper display device in the present invention, it is possible to form colorants with different reflectance to have different size by providing different pigments, thereby manufacturing a color electronic paper display device containing colorants having the same reflectance as one other.

In a method for manufacturing the color electronic paper display device in the present invention, it is possible to manufacture a color electronic paper display device with improved clarity, color expressiveness, and brightness characteristics by uniformizing reflectance amount of the colorants.

In a method for manufacturing the color electronic paper display device in the present invention, it is possible to manufacture a color electronic paper display device which has colorants with different sizes and a planar arrangement structure in which it is possible to reduce intervals therebetween. Thus, it is possible to manufacture a color electronic paper display device with improved clarity, color expressiveness, and brightness characteristics by minimizing intervals between colorants.

In a method for manufacturing the color electronic paper display device in the present invention, it is possible to manufacture a color electronic paper display device with improved clarity, color expressiveness, and brightness characteristics by providing colorants having fluorescence pigments added thereto. Thus, it is possible to manufacture a color electronic paper display device with improved brightness and contrast ratio by increase in reflectance amount of the colorants.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A color electronic paper display device comprising:
a base;
a first colorant disposed on the base;
a second colorant disposed on the base, the second colorant having higher reflectance and smaller size than those of the first colorant; and
an electrode part for applying voltages to the first and second colorants.

2. The color electronic paper display device of claim 1, wherein the first colorant has the same reflecting amount as that of the second colorant.

3. The color electronic paper display device of claim 1, wherein the first colorant and the second colorant include electronic balls each of which is constituted by hemispheres into which mutually different pigments are provided, the second colorant having a diameter lower than that of the first colorant.

4. The color electronic paper display device of claim 1, wherein the first colorant and the second colorant have light-transmissive fluid containing pigment particles electrified into different charges, the second colorant having a volume less than that of the first colorant.

5. The color electronic paper display device of claim 1, wherein the base comprises:
a plate for supporting the first colorant and the second colorant; and
a partition wall extending from the plate, the partition wall partitioning the first colorant and the second colorant on the plate.

6. The color electronic paper display device of claim 5, wherein the base has cavities provided as spaces where the first and second colorants are disposed, and the partition wall helping the guiding of the first and second colorants so that the first and second colorants are entered into the cavities in a self-alignment manner.

7. The color electronic paper display device of claim 1, wherein the base has one side where a lower electrode is disposed and the other side where an upper electrode is disposed,
wherein the lower electrode comprises:
a first electrode opposite to the first colorant; and
a second electrode opposite to the second colorant, and
wherein the upper electrode comprises an electrode plate corresponding to the first colorant and the second colorant.

8. The color electronic paper display device of claim 7, wherein the base is provided with cavities provided as spaces where the first colorant and the second colorant are disposed, each of the cavities being formed with an upper portion opened toward the upper electrode, a side surface surrounding the first and second colorants, and a lower surface for supporting the first and second colorants.

9. The color electronic paper display device of claim 8, wherein the first and second colorants are disposed to be spaced apart from the upper electrode at uniform intervals within the cavities.

10. The color electronic paper display device of claim 1, further comprising a third colorant which is disposed on the base and has higher reflectance and smaller size than those of the second colorant,
wherein one cell is constituted by the first to third colorants whose centers are inter-connected to be in a triangle shape.

11. The color electronic paper display device of claim 10, wherein the cell includes first cells and second cells disposed to be rotated by 180° with respect to the first cells,
wherein the first and second cells are alternatively disposed along a first direction, and are repeatedly disposed along a second direction perpendicular to the first direction.

12. The color electronic paper display device of claim 10, wherein the cell includes first cells and second cells disposed to be rotated by 180° with respect to the first cells,
wherein the first and second cells are alternatively disposed along a first direction and a second direction perpendicular to the first direction.

13. The color electronic paper display device of claim 10, wherein the cell include first cells and second cells disposed to be rotated by 180° with respect to the first cells,
wherein the first and second cells are alternatively disposed along a first direction and a second direction perpendicular to the first direction, the first and second cells being disposed to have an interdigited configuration.

14. The color electronic paper display device of claim 1, further comprising a third colorant which is disposed on the base and has higher reflectance and smaller size than those of the second colorant,
wherein one cell is constituted by the first to third colorants whose centers are disposed on the same line.

15. The color electronic paper display device of claim 1, further comprising:
a third colorant which is disposed on the base and has higher reflectance and smaller size than those of the second colorant; and
a fourth colorant which is disposed on the base and has higher reflectance and smaller size than those of the third colorant,
wherein one cell is constituted by the first to fourth colorants whose centers are inter-connected to be in a quadrangle shape.

16. The color electronic paper display device of claim 1, further comprising:
a third colorant which is disposed on the base and has higher reflectance and smaller size than those of the second colorant; and a fourth colorant which is disposed on the base and has higher reflectance and smaller size than those of the third colorant, wherein one cell is constituted by the first to fourth colorants whose centers are disposed on one line.

17. The color electronic paper display device of claim 16, wherein the cell includes first cells and second cells disposed to be rotated by 180° with respect to the first cells, wherein the first and second cells are alternatively disposed along a first direction in an iterative manner.

18. The color electronic paper display device of claim 1, wherein the first colorant and second colorant further comprise fluorescence pigment.

19. The color electronic paper display device of claim 18, wherein each of the first and second colorants contains electronic balls formed by hemisphere electrified into different charges, and the fluorescence pigment is contained in any one of the hemisphere.

20. The color electronic paper display device of claim 19, wherein the fluorescence pigment is provided to a hemisphere in the hemisphere which has a relatively high reflectance.

21. The color electronic paper display device of claim 18, wherein each of the first colorant and second colorant comprises:

light-transmissive fluid;

pigment particles disposed on the light-transmissive fluid, wherein the fluorescence pigment is electrified into charges as many as those of particles which have high reflectance in the pigment particles.

22. The color electronic paper display device of claim 18, wherein the fluorescence pigment includes at least one of C.I.Acid yellow, C.I.Basic orange, C.I.acid red, eosin, cu-added zns, mn-added zns, ag-added zns, bi-added zns, fluorescein, tungsten acid calcium:cawo4, tungsten acid magnesium:mgwo4, znsio3-mn, cdsio2-mn, cdb2o5, and cdb2o5.

23. The color electronic paper display device of claim 22, wherein the C.I.Basic orange corresponds to C.I.Basic orange 14.

24. The color electronic paper display device of claim 22, wherein the C.I.acid red corresponds to C.I.acid red 87.

25. A color electronic paper display device comprising:

a base provided with cavities;

colorants which are disposed in the cavities and constitute a cell; and an electrode part for applying voltages to the colorants, wherein the colorants constituting the cell have the same reflection amount as one other and have pigments and sizes different from one another.

26. The color electronic paper display device of claim 25, wherein each of the colorants has electronic balls constituted by hemisphere electrified into different charges, any one of the hemisphere having the higher reflectance.

27. The color electronic paper display device of claim 26, wherein the cell has the electronic balls in plural disposed thereon, the electronic balls whose centers are inter-connected to be in a triangle shape.

28. The color electronic paper display device of claim 26, wherein the cell has the electronic balls in plural disposed thereon, the electronic balls having centers positioned on one line.

29. The color electronic paper display device of claim 26, further comprising fluorescence pigment provided to a hemisphere having the higher reflectance of the hemisphere.

30. The color electronic paper display device of claim 29, wherein the fluorescence pigment includes at least one of C.I.Acid yellow, C.I.Basic orange C.I.acid red, eosin, Cu-added ZnS, Mn-added ZnS, Ag-added ZnS, Bi-added ZnS, fluorescein, tungsten acid calcium:CaWO4, tungsten acid magnesium:MgWO4, ZnSiO3-Mn, CdSiO2-Mn, CdB2O5, and CdB2O5.

31. The color electronic paper display device of claim 25, wherein the colorant comprises:

a light-transmissive fluid; and pigment particles electrified into different charges, the pigment particles being disposed within the light-transmissive fluid.

32. The color electronic paper display device of claim 31, further comprising fluorescence pigment which is disposed within the light-transmissive fluid and is electrified into charges as many as those of pigments particles that have the higher reflectance of the pigment particles.

33. The color electronic paper display device of claim 32, wherein the fluorescence pigment includes at least one of C.I.Acid yellow, C.I.Basic orange, C.I.acid red, eosin, Cu-added ZnS, Mn-added ZnS, Ag-added ZnS, Bi-added ZnS, fluorescein, tungsten acid calcium:CaWO4, tungsten acid magnesium:MgWO4, ZnSiO3-Mn, CdSiO2-Mn, CdB2O5, and CdB2O5.

34. A method for manufacturing a color electronic paper display device comprising:

preparing a base;

disposing a first colorant on the base;

disposing a second colorant with higher reflectance and smaller size than those of the first colorant; and forming an electrode part, which applies voltages the first colorant and the second colorant, on the base.

35. The method of claim 34, wherein the first colorant and the second colorant are controlled to have the same reflection amount as each other.

36. The method of claim 34, wherein preparing the base comprises:

preparing a pre-base; and forming cavities which are provided as spaces where the first colorant and second colorant are disposed on the pre-base and have mutually different sizes.

37. The method of claim 36, wherein disposing the first colorant comprises:

preparing a first electronic ball constituted by hemisphere electrified into different charges; and providing the first electronic ball on the base to thereby be entered into a cavity with the largest size in the cavities by a self-alignment manner.

38. The method of claim 37, wherein disposing the second colorant comprises:

preparing a second electronic ball with a lower size than that of the first electronic ball; and after supplying the first electronic ball on the base, supplying the second electronic ball on the base to thereby be entered into a second-largest cavity in the cavities by a self-alignment manner.

39. The method of claim 36, wherein forming the cavities comprises performing at least one of a photoresist etching process, a laser drill manufacturing process, and a mechanical drill manufacturing process for the pre-base.

40. The method of claim 36, wherein disposing the first colorant comprises:

infusing light-transmissive fluid into the cavity; and infusing pigment particles electrified into different charges into the light-transmissive fluid.

41. The method of claim 34, wherein forming the electrode part comprises:

forming a lower electrode on one side of the base;

forming an upper electrode on the other side of the base, wherein the step of forming the lower electrode comprises:
  forming a first electrode disposed to correspond to the first colorant; and
  forming a second electrode disposed to correspond to the second colorant, and
  wherein forming the upper electrode comprises forming an electrode plate corresponding to the first and second colorants.

42. The method of claim 34, wherein preparing the base comprises preparing a pre-base shaped like a plate, and
  wherein forming the electrode part comprises:
    before the first and second colorants are disposed on the base, forming the lower electrode on a lower portion of the pre-base; and
    after the first and second colorants are disposed on the base, forming the upper electrode on an upper portion of the pre-base.

43. The method of claim 42, wherein forming the upper electrode is performed after cavities are formed as spaces where the first and second colorants are disposed on the pre-base.

44. The method of claim 34, further comprising disposing a third colorant with which the first and second colorants constitute one cell, on the base, wherein, in disposing the first to third colorants, when centers of first to third colorants are inter-connected, the centers are formed in a triangle shape.

45. The method of claim 34, further comprising disposing a third colorant with which the first and second colorants constitute one cell, on the base, wherein, in disposing the first to third colorants, centers of the first to third colorants are positioned on one line.

46. The method of claim 34, further comprising disposing third and fourth colorant with which the first and second colorants constitute one cell, on the base, wherein, in disposing the first to fourth colorants, when centers of first to fourth colorants are inter-connected, the centers are formed in a quadrangle shape.

47. The method of claim 34, further comprising disposing third and fourth colorant with which the first and second colorants constitute one cell, on the base, wherein, in disposing the first to fourth colorants, centers of first to fourth colorants are disposed to be positioned on one line.

48. The method of claim 34, further comprising providing fluorescence pigments to the first and second colorants.

49. The method of claim 48, wherein, in providing fluorescence pigments, at least one of C.I.Acid yellow, C.I.Basic orange, C.I.acid red, eosin, Cu-added ZnS, Mn-added ZnS, Ag-added ZnS, Bi-added ZnS, fluorescein, tungsten acid calcium:$CaWO_4$, tungsten acid magnesium:$MgWO_4$, $ZnSiO_3$-Mn, $CdSiO_2$-Mn, $CdB_2O_5$, and $CdB_2O_5$ are provided to the first and second colorants.

* * * * *